(12) United States Patent
Iitani et al.

(10) Patent No.: US 12,480,276 B2
(45) Date of Patent: Nov. 25, 2025

(54) ELECTRIC CYLINDER AND WORK MACHINE

(71) Applicant: Komatsu Ltd., Tokyo (JP)

(72) Inventors: Hideshi Iitani, Tokyo (JP); Shouta Akazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 116 days.

(21) Appl. No.: 18/285,321

(22) PCT Filed: May 9, 2022

(86) PCT No.: PCT/JP2022/019668
§ 371 (c)(1),
(2) Date: Oct. 2, 2023

(87) PCT Pub. No.: WO2022/239732
PCT Pub. Date: Nov. 17, 2022

(65) Prior Publication Data
US 2024/0183121 A1 Jun. 6, 2024

(30) Foreign Application Priority Data
May 10, 2021 (JP) ................. 2021-079546

(51) Int. Cl.
*E02F 3/42* (2006.01)
*E02F 9/20* (2006.01)
*F16H 25/22* (2006.01)
*F16H 25/20* (2006.01)
*F16H 57/04* (2010.01)

(52) U.S. Cl.
CPC .............. *E02F 3/427* (2013.01); *E02F 9/202* (2013.01); *F16H 25/2204* (2013.01); *F16H 2025/2081* (2013.01); *F16H 2025/2087* (2013.01); *F16H 57/0464* (2013.01); *F16H 57/0479* (2013.01); *F16H 57/0486* (2013.01)

(58) Field of Classification Search
CPC ... E02F 3/427; E02F 3/38; E02F 3/425; E02F 9/202; E02F 9/2095; F16H 25/2204; F16H 2025/2081; F16H 2025/2087; F16H 57/0464; F16H 57/0479; F16H 57/0486
See application file for complete search history.

(56) References Cited

U.S. PATENT DOCUMENTS

2009/0260463 A1    10/2009  Fukano et al.
2009/0270220 A1*   10/2009  Fukano ............... F16H 3/54
                                                      475/300

(Continued)

FOREIGN PATENT DOCUMENTS

JP   H03-004962 Y2   2/1991
JP   2009-275914 A   11/2009
(Continued)

*Primary Examiner* — Timothy Hannon
(74) *Attorney, Agent, or Firm* — Troutman Pepper Locke LLP

(57) ABSTRACT

This electric cylinder includes a motor that serves as a driving source, an output shaft that rotates in response to driving of the motor, a first rotor that is joined to the output shaft and rotates in response to rotation of the output shaft, and a second rotor that is adjacent to the first rotor and rotates in response to rotation of the first rotor. The first rotor has an open hollow portion capable of accommodating a lubricant therein.

9 Claims, 12 Drawing Sheets

(56) References Cited

U.S. PATENT DOCUMENTS

| | | | |
|---|---|---|---|
| 2019/0017502 A1* | 1/2019 | Ohm | F16H 25/20 |
| 2021/0381193 A1 | 12/2021 | Ishikawa et al. | |
| 2024/0183121 A1* | 6/2024 | Iitani | E02F 9/2095 |

FOREIGN PATENT DOCUMENTS

| | | |
|---|---|---|
| JP | 2012-007684 A | 1/2012 |
| JP | 2020-204172 A | 12/2020 |
| JP | 2021-035255 A | 3/2021 |

* cited by examiner

ELECTRIC CYLINDER AND WORK MACHINE

TECHNICAL FIELD

The present invention relates to an electric cylinder and a work machine.

Priority is claimed on Japanese Patent Application No. 2021-079546, filed May 10, 2021, the content of which is incorporated herein by reference.

BACKGROUND ART

Patent Document 1 discloses an electric excavator as an example of a work machine. The electric excavator includes a vehicle main body, a boom that is provided turnably with respect to the vehicle main body, and an electric cylinder. The boom is driven by the electric cylinder.

Patent Document 2 discloses, as an electric cylinder, a constitution including an inner cylinder that stores a screw shaft extending in a vertical direction, and an outer cylinder that stores the inner cylinder in a retractable manner. The inner cylinder is fixed to a nut screwed to the screw shaft. A lubricant circulating inside the outer cylinder through a circulation hole is enclosed in a lower half portion inside the inner cylinder. An air chamber having an atmosphere communication hole formed in an upper end portion of the inner cylinder is formed in an upper half portion inside the inner cylinder.

Patent Document 3 discloses a constitution including a body that is elongated in an axial direction, and a displacement mechanism that is provided inside the body. The displacement mechanism includes a screw shaft accommodated inside the body, a displacement nut screwed to the screw shaft, a piston mounted on an outer circumferential side of the displacement nut, and a piston rod joined to the piston. A first end portion of the screw shaft is joined to a connector. The connector is supported by a bearing in a rotatable manner. A second end portion of the screw shaft is joined to a holder. A support ring is provided on an outer circumferential surface of the holder. An outer circumferential surface of the support ring is formed to have a plurality of support portions in an uneven shape. The support portions come into sliding contact with an inner circumferential surface of the piston rod and support the piston rod in the axial direction in a displaceable manner. A stirring groove for guiding a lubricant is formed on the outer circumferential surface of the support ring.

RELATED ART DOCUMENT

Patent Document

[Patent Document 1]
Japanese Unexamined Patent Application, First Publication No. 2020-204172
[Patent Document 2]
Japanese Examined Utility Model Application, Second Publication No. H3-4962
[Patent Document 3]
Japanese Unexamined Patent Application, First Publication No. 2009-275914

SUMMARY

Problems to be Solved by the Invention

In the case of Patent Document 1, the boom turns in response to driving of the electric cylinder. In Patent Document 1, in order to prevent problems caused by heat generated from a motor that is a driving source for the electric cylinder, it is required to efficiently release heat from the motor to the outside.

In the case of Patent Document 2, a lubricant is enclosed inside the inner cylinder and inside the outer cylinder.

In the case of Patent Document 3, a lubricant is stirred by the stirring groove of the support ring.

In Patent Document 2 and Patent Document 3, a motor disposed parallel to the screw shaft is provided. There is room for improvement in efficiently releasing heat from the motor to the outside in order to prevent problems caused by heat generated from the motor.

Hence, an object of the present invention is to provide an electric cylinder and a work machine in which heat from a motor can be efficiently released to the outside.

Means for Solving the Problem

An electric cylinder according to an aspect of the present invention includes a motor that serves as a driving source, an output shaft that rotates in response to driving of the motor, a first rotor that is joined to the output shaft and rotates in response to rotation of the output shaft, and a second rotor that is adjacent to the first rotor and rotates in response to rotation of the first rotor. The first rotor has an open hollow portion capable of accommodating a lubricant therein.

Advantage of the Invention

According to the foregoing aspect, heat from a motor can be efficiently released to the outside.

DESCRIPTION OF THE EMBODIMENTS

Hereinafter, an embodiment of the present invention will be described with reference to the drawings. In the embodiment, an excavator will be described as an example of a work machine (work vehicle).

<Excavator (Work Machine)>

Figure 1:
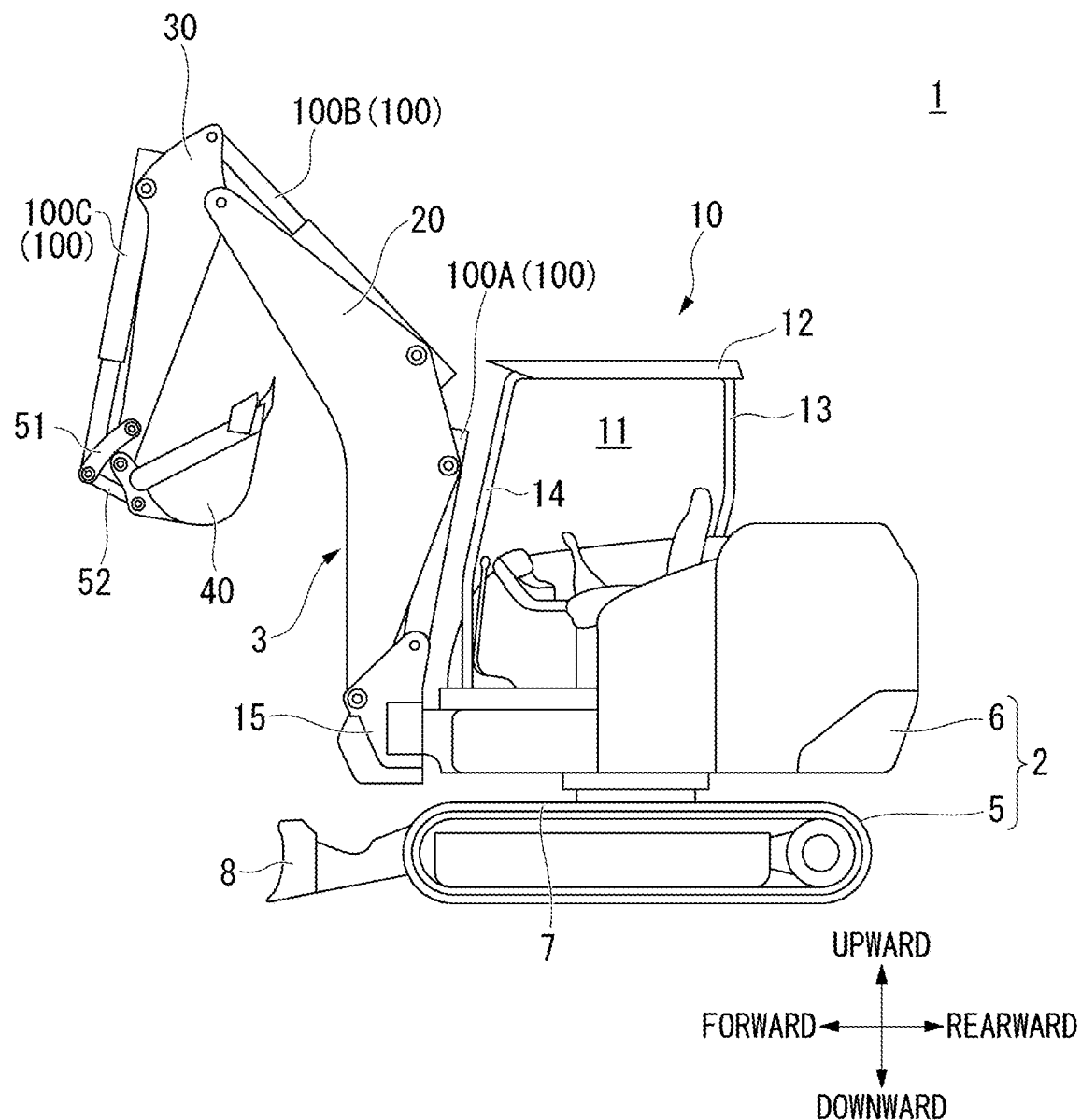
FIG. 1 is a side view of an excavator according to an embodiment.

As illustrated in FIG. 1, an excavator 1 serving as a work machine includes a vehicle main body 2 and a work apparatus 3 joined to the vehicle main body 2. Hereinafter, a forward movement direction, a rearward movement direction, and a vehicle width direction of the excavator 1 will be referred to as "a forward direction of the vehicle (toward one side in a forward-rearward direction of the vehicle)", "a rearward direction of the vehicle (toward the other side in the forward-rearward direction of the vehicle)", and "the vehicle width direction", respectively. The vehicle width direction may also be referred to using "the left side (a first side in the vehicle width direction)" or "the right side (a second side in the vehicle width direction)". A right-hand side with respect to the direction in which the excavator 1 moves forward will be referred to as the right side, and a left-hand side with respect to the direction in which the excavator 1 moves forward will be referred to as the left side. A vertical direction, upward, and downward in a state in which the excavator 1 is disposed on a horizontal surface will be simply referred to as "a vertical direction", "upward" and "downward", respectively.

<Vehicle Main Body>

The vehicle main body 2 includes a self-propelled lower traveling body 5, and an upper swing body 6 which is provided on the lower traveling body 5 in a swingable manner.

The lower traveling body 5 has a pair of left and right crawler belts 7. The lower traveling body 5 is provided with an electric motor (not illustrated) for driving the crawler belts 7. The lower traveling body 5 travels when the crawler belts 7 are driven by the electric motor. The lower traveling body 5 may be provided with a hydraulic motor in place of an electric motor.

A blade 8 serving as an earth-moving plate extending in the vehicle width direction of the lower traveling body 5 is provided in a front portion of the lower traveling body 5. The lower traveling body 5 includes an electric actuator (not illustrated) for driving the blade 8. The height position of the blade 8 can be adjusted by driving the electric actuator.

The upper swing body 6 is provided in an upper portion of the lower traveling body 5. An electric motor for traveling that is a driving source for the lower traveling body 5, a motor of an electric cylinder that is a driving source for the work apparatus 3, a battery serving as a power source for each of the motors, an inverter and the like (not illustrated) are provided in the upper swing body 6. The upper swing body 6 can swing around an axis extending in the vertical direction with respect to the lower traveling body 5.

A canopy 10 is provided in the upper swing body 6. The canopy 10 has an operation space 11 which can accommodate an operator. The canopy 10 includes a hood 12 forming a ceiling portion of the operation space 11, rear struts 13 provided on both sides of a rear portion of the hood 12 in the vehicle width direction and extending downward from the hood 12, and front portion struts 14 provided on both sides of a front portion of the hood 12 in the vehicle width direction and extending downward from the hood 12.

Figure 2:
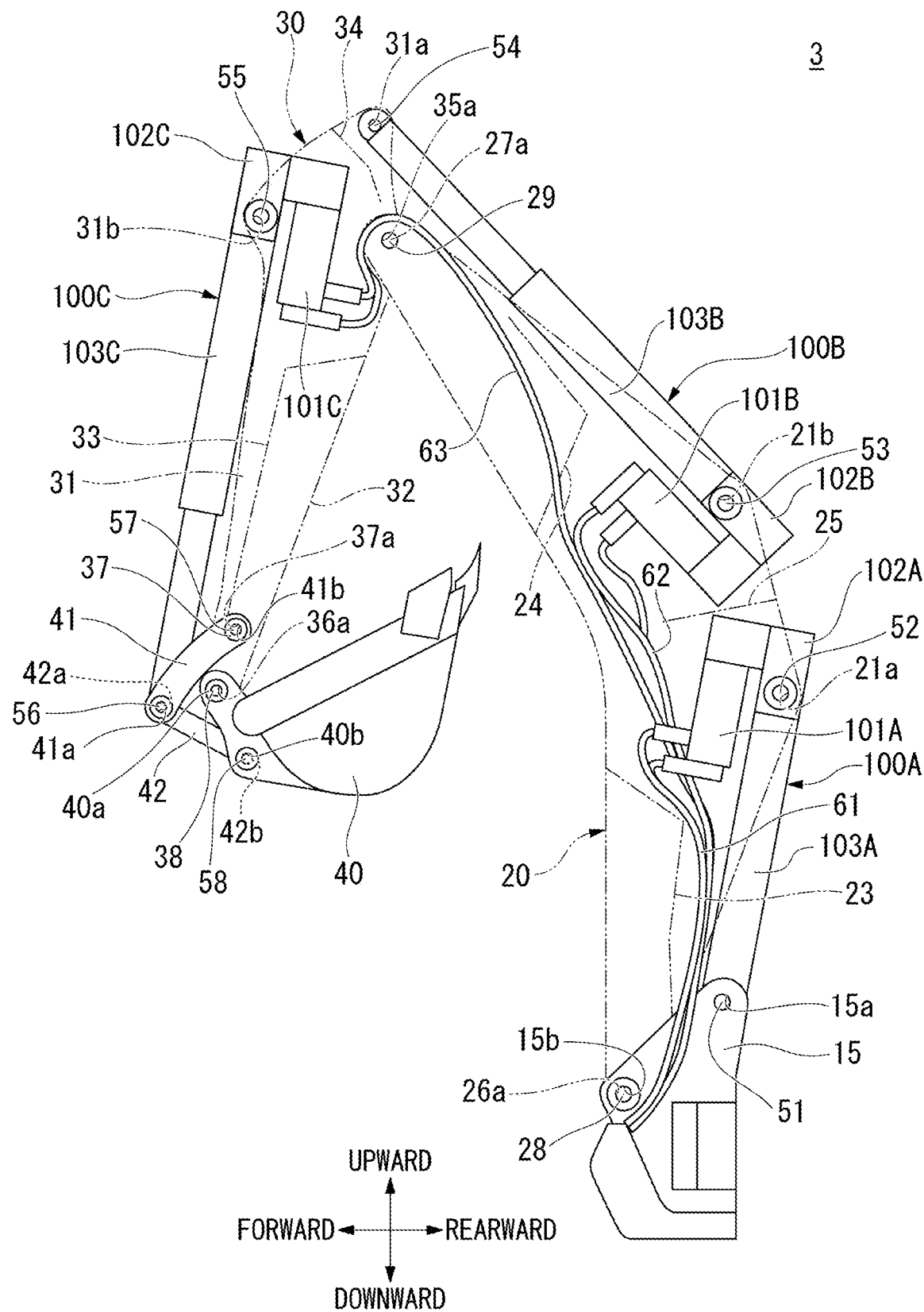
FIG. 2 is a side view of a work apparatus according to the embodiment and is a transparent view illustrating the inside of a boom and an arm.

A bracket 15 for supporting a boom 20 is provided in a front portion of the upper swing body 6. As illustrated in FIG. 2, the bracket 15 has a first hole 15a and a second hole 15b opening in the vehicle width direction of the upper swing body 6. The first hole 15a is disposed in the vicinity of an upper end portion of the bracket 15. The second hole 15b is disposed on a side downward and forward from the first hole 15a.

<Work Apparatus>

As illustrated in FIG. 1, the work apparatus 3 is provided such that it can be operated in a bendable and hoistable manner with respect to the upper swing body 6. The work apparatus 3 includes the boom 20, an arm 30, a bucket 40 (work tool), and a plurality of (for example, three in the present embodiment) electric cylinders 100A to 100C. The three electric cylinders 100A to 100C are constituted of a first electric cylinder 100A for operating the boom 20, a second electric cylinder 100B for operating the arm 30, and a third electric cylinder 100C for operating the bucket 40. A base end portion of the boom 20 is rotatably joined to the upper swing body 6. A distal end portion of the boom 20 is rotatably joined to a base end portion of the arm 30. A distal end portion of the arm 30 is rotatably joined to the bucket 40.

<Boom>

In the posture in FIG. 1, when viewed in the vehicle width direction of the upper swing body 6, the boom 20 extends upward from the bracket 15, bends, and then extends upward toward the front. Hereinafter, when viewed in the vehicle width direction of the upper swing body 6, a direction in which the boom 20 extends will be regarded as "a boom extending direction", and a direction orthogonal to the direction in which the boom extends will be regarded as "a boom plate width direction". A first end portion of the boom 20 in the boom extending direction (an end portion on the bracket 15 side) will be regarded as "a boom base end portion". A second end portion of the boom 20 in the boom extending direction (an end portion on a side opposite to the boom base end portion) will be regarded as "a boom distal end portion". The dimension in the boom plate width direction gradually increases from the boom base end portion toward a part in the vicinity of the center in the boom extending direction and then gradually decreases toward the boom distal end portion.

Figure 3:
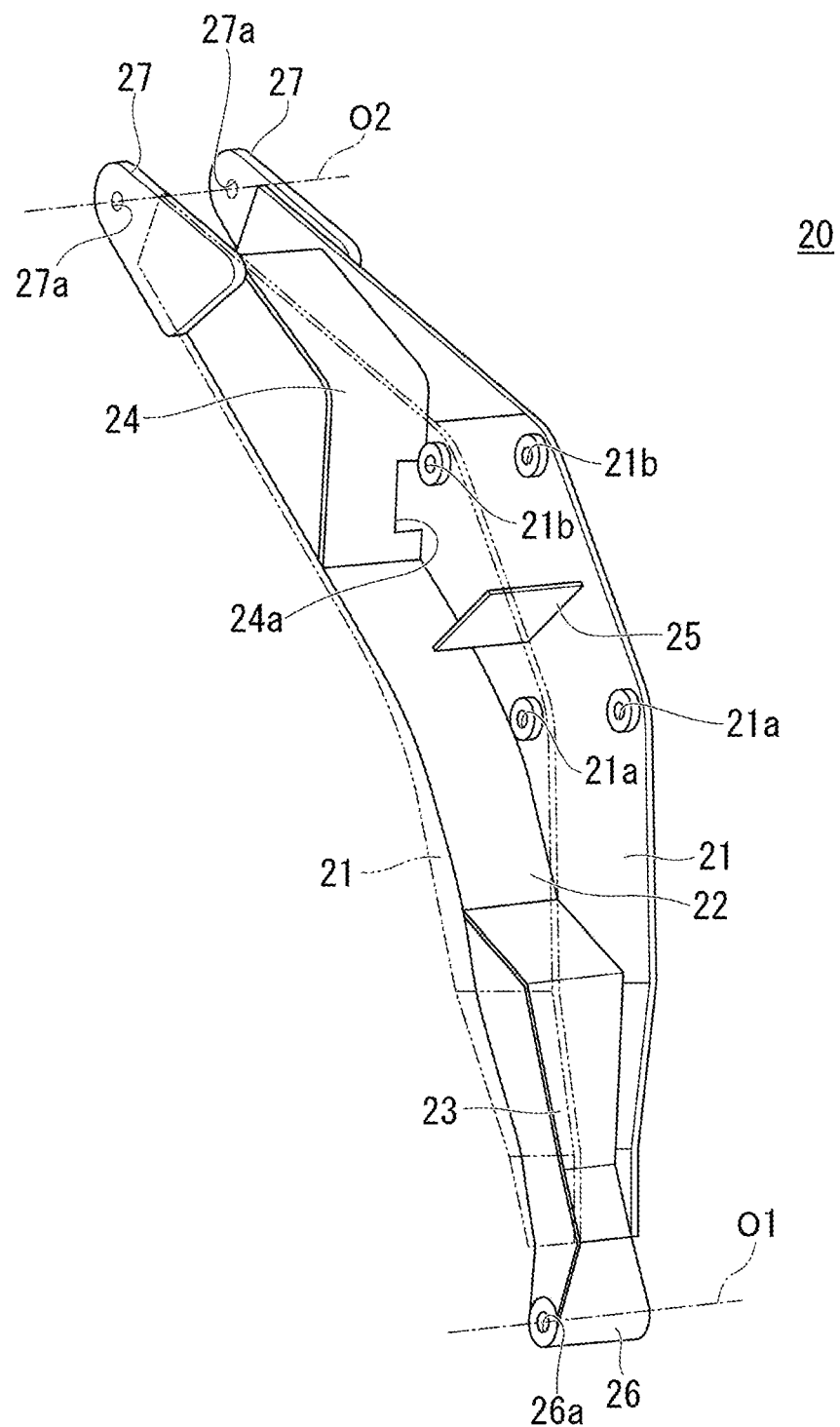
FIG. 3 is a perspective view of the boom according to the embodiment and is a transparent view illustrating the inside of the boom.

As illustrated in FIG. 3, the boom 20 includes a pair of boom side plates 21 disposed away from each other in the vehicle width direction of the upper swing body 6, a boom bottom plate 22 extending in the vehicle width direction of the upper swing body 6 and connecting the pair of boom side plates 21 to each other, a boom base end side connection plate 23 connected to the boom base end portion side of the boom bottom plate 22, a boom distal end side connection plate 24 connected to the boom distal end portion side of the boom bottom plate 22, a boom partitioning member 25 partitioning a space sandwiched between the pair of boom side plates 21 in the vicinity of the center in the boom extending direction, a boom base end support member 26 having the boom base end portion supported by the upper swing body 6, and arm support plates 27 supporting the arm 30.

Each of the boom side plates 21 has a first cylinder base end side hole 21a and a second cylinder base end side hole 21b opening in the vehicle width direction of the upper swing body 6. As illustrated in FIG. 2, when viewed in the vehicle width direction of the upper swing body 6, the first cylinder base end side hole 21a is disposed on a lower side in the vicinity of the center in the boom extending direction and in a part overlapping a portion of the first electric cylinder 100A (in the vicinity of the upper end portion in FIG. 2). When viewed in the vehicle width direction of the upper swing body 6, the second cylinder base end side hole 21b is disposed on an upper side in the vicinity of the center in the boom extending direction and in a part overlapping a portion of the second electric cylinder 100B (in the vicinity of the lower end portion in FIG. 2).

As illustrated in FIG. 3, the boom bottom plate 22 is provided at an edge portion on a side opposite to the upper swing body 6 in the boom plate width direction of the boom side plates 21. The boom bottom plate 22 extends in the boom extending direction. The boom bottom plate 22 is curved toward a part between the first cylinder base end side hole 21a and the second cylinder base end side hole 21b in the vicinity of the center in the boom extending direction.

The boom base end side connection plate 23 extends in the vehicle width direction of the upper swing body 6 on the boom base end portion side and connects the pair of boom side plates 21 to each other. The boom base end side connection plate 23 bends after extending in a manner of approaching the boom base end portion as it goes away from a connection portion with respect to the boom bottom plate 22 in the boom plate width direction and extends toward the boom base end portion.

The boom distal end side connection plate 24 extends in the vehicle width direction of the upper swing body 6 on the boom distal end portion side and connects the pair of boom side plates 21 to each other. The boom distal end side connection plate 24 bends after extending in a manner of approaching the boom distal end portion as it goes away from the connection portion with respect to the boom bottom plate 22 in the boom plate width direction and extends toward the boom distal end portion. The boom distal end side connection plate 24 has an opening portion 24a opening in the boom extending direction at a position adjacent to one boom side plate 21.

The boom partitioning member 25 extends in the vehicle width direction of the upper swing body 6 in the vicinity of the center in the boom extending direction and connects the pair of boom side plates 21 to each other. The boom partitioning member 25 extends in the boom plate width direction. The boom partitioning member 25 is disposed between the first cylinder base end side hole 21a and the second cylinder base end side hole 21b. The boom partitioning member 25 is separated from the boom bottom plate 22 in the boom plate width direction.

The boom base end support member 26 is provided on the boom base end portion side. The boom base end support member 26 has a first penetration hole 26a opening in the vehicle width direction of the upper swing body 6. A first pin 28 (refer to FIG. 2) extending in the vehicle width direction of the upper swing body 6 is inserted through the first penetration hole 26a. The boom 20 is supported turnably around a central axis O1 of the first pin 28 due to the first pin 28 inserted through the first penetration hole 26a of the boom base end support member 26 and the second hole 15b of the bracket 15.

The arm support plates 27 are provided on the boom distal end portion side. Arm support portions 16 are provided on outer surfaces of the boom side plates 21 in a manner of sandwiching the pair of boom side plates 21 from the outward side in the vehicle width direction of the upper swing body 6. The arm support plates 27 protrude outward in the boom extending direction beyond the boom side plates 21. Each of the arm support plates 27 has a second penetration hole 27a opening in the vehicle width direction of the upper swing body 6. The second penetration hole 27a is provided in a part protruding outward in the boom extending direction beyond the boom side plate 21 in the arm support plate 27. A second pin 29 (refer to FIG. 2) extending in the vehicle width direction of the upper swing body 6 is inserted through the second penetration holes 27a.

<Arm>

In the posture in FIG. 1, when viewed in the vehicle width direction of the upper swing body 6, the arm 30 extends downward toward the front from a part overlapping a portion of the second electric cylinder 100B (in the vicinity of the upper end portion in FIG. 1). Hereinafter, when viewed in the vehicle width direction of the upper swing body 6, a direction in which the arm 30 extends will be regarded as "an arm extending direction", and a direction orthogonal to the direction in which the arm extends will be regarded as "an arm plate width direction". A first end portion of the arm 30 in the arm extending direction (an end portion on the second electric cylinder 100B side) will be regarded as "an arm base end portion". A second end portion of the arm 30 in the arm extending direction (an end portion on a side opposite to the arm base end portion) will be regarded as "an arm distal end portion". The dimension of the arm plate width direction gradually increases from the arm base end portion toward a part in the vicinity of a boom connection portion in the arm extending direction and then gradually decreases toward the arm distal end portion.

Figure 4:
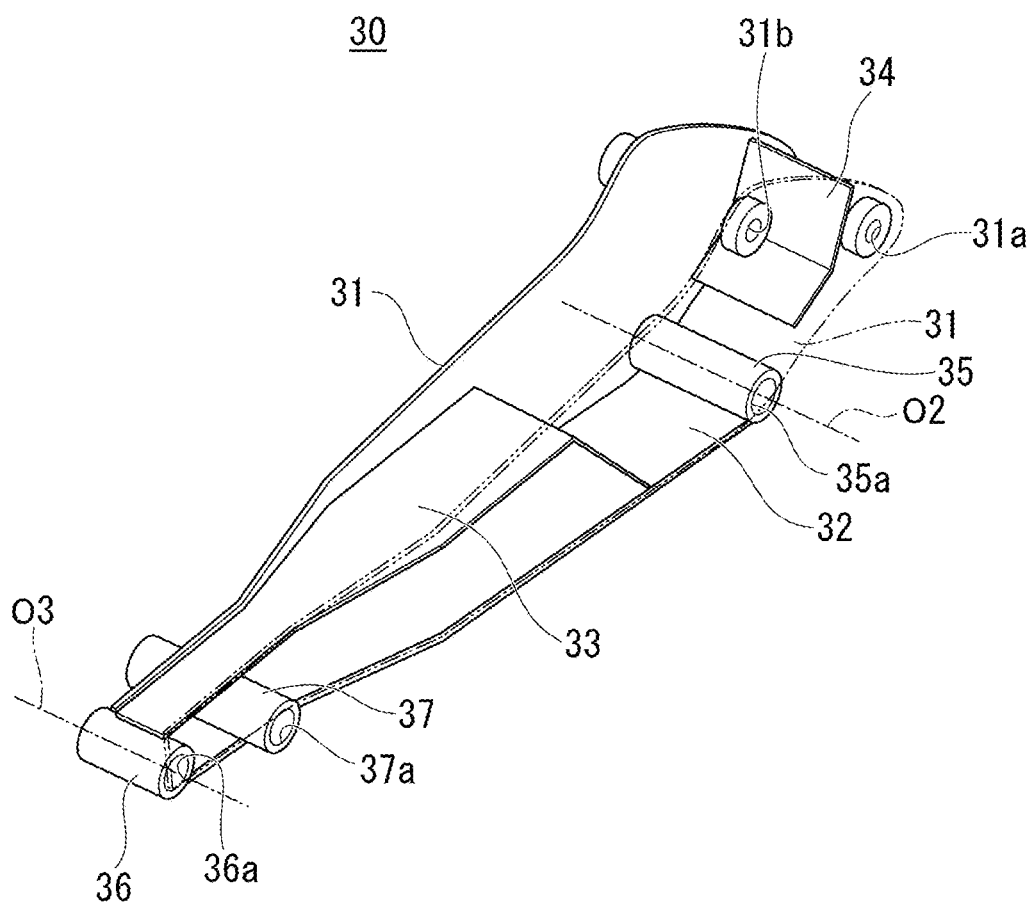
FIG. 4 is a perspective view of the arm according to the embodiment and is a transparent view illustrating the inside of the arm.

As illustrated in FIG. 4, the arm 30 includes a pair of arm side plates 31 disposed away from each other in the vehicle width direction of the upper swing body 6, an arm bottom plate 32 extending in the vehicle width direction of the upper swing body 6 and connecting the pair of arm side plates 31 to each other, an arm side connection plate 33 connected to the arm bottom plate 32, an arm partitioning member 34 partitioning a space sandwiched between the pair of arm side plates 31 in the vicinity of the arm base end portion, a boom distal end connection member 35 connected to the boom distal end portion, a bucket support member 36 supporting the bucket 40 (refer to FIG. 2), and a link support member 37 supporting a first end portion of a first link member 41 (refer to FIG. 2).

Each of the arm side plates 31 has a second cylinder distal end side hole 31a and a third cylinder base end side hole 31b opening in the vehicle width direction of the upper swing body 6. As illustrated in FIG. 2, when viewed in the vehicle width direction of the upper swing body 6, the second cylinder distal end side hole 31a is disposed in the vicinity of the arm base end portion and in a part overlapping a portion of the second electric cylinder 100B (in the vicinity of the upper end portion in FIG. 2). When viewed in the vehicle width direction of the upper swing body 6, the third cylinder base end side hole 31b is disposed on a side opposite to a part overlapping the boom distal end portion in the arm plate width direction and in a part overlapping a portion of the third electric cylinder 100C (in the vicinity of the upper end portion in FIG. 2).

In the posture in FIG. 2, the arm bottom plate 32 is provided in edge portions of the arm side plates 31 in the arm plate width direction on the upper swing body 6 side (boom 20 side). The arm bottom plate 32 extends in the arm extending direction. As illustrated in FIG. 4, the arm bottom plate 32 extends between the boom distal end connection member 35 and the bucket support member 36 in the arm extending direction.

The arm side connection plate 33 extends in the vehicle width direction of the upper swing body 6 on the arm distal end portion side and connects the pair of arm side plates 31 to each other. The arm side connection plate 33 bends after extending in a manner of approaching the arm distal end portion as it goes away from a connection portion with respect to the arm bottom plate 32 in the arm plate width direction and extends toward the arm distal end portion.

The arm partitioning member 34 extends in the vehicle width direction of the upper swing body 6 in the vicinity of the arm base end portion and connects the pair of arm side plates 31 to each other. The arm partitioning member 34 is disposed between the second cylinder distal end side hole 31a and the third cylinder base end side hole 31b. The arm partitioning member 34 is disposed away from the boom distal end connection member 35. When viewed in the vehicle width direction of the upper swing body 6, the arm partitioning member 34 bends after extending from a part in the vicinity of the boom distal end connection member 35 toward the arm distal end portion side and extends in a manner of traversing a part between the second cylinder distal end side hole 31a and the third cylinder base end side hole 31b.

The boom distal end connection member 35 is formed to have a cylindrical shape extending in the vehicle width direction of the upper swing body 6. The boom distal end connection member 35 has a boom connection hole 35a opening in the vehicle width direction of the upper swing body 6. As illustrated in FIG. 2, when viewed in the vehicle width direction of the upper swing body 6, the boom connection hole 35a overlaps the second penetration holes 27a of the arm support plates 27. The arm 30 is supported turnably around a central axis O2 of the second pin 29 (refer to FIG. 4) due to the second pin 29 inserted through the second penetration holes 27a of the arm support plates 27 and the boom connection hole 35a of the boom distal end connection member 35.

As illustrated in FIG. 4, the bucket support member 36 is provided in the arm distal end portion. The bucket support member 36 is formed to have a cylindrical shape extending in the vehicle width direction of the upper swing body 6. The bucket support member 36 has a third penetration hole 36a opening in the vehicle width direction of the upper swing body 6. A third pin 38 (refer to FIG. 2) extending in the vehicle width direction of the upper swing body 6 is inserted through the third penetration hole 36a.

As illustrated in FIG. 4, the link support member 37 is disposed between the arm bottom plate 32 and the arm side connection plate 33. The link support member 37 is disposed in the vicinity of the bucket support member 36. The link support member 37 is formed to have a cylindrical shape extending in the vehicle width direction of the upper swing body 6. The link support member 37 protrudes outward in the vehicle width direction of the upper swing body 6 beyond the pair of arm side plates 31. The link support member 37 has a first link connection hole 37a opening in the vehicle width direction of the upper swing body 6.

<Bucket>

In the posture in FIG. 2, the bucket 40 is inclined from the arm distal end portion toward a part in the vicinity of the center in the boom extending direction. The bucket 40 has a bucket connection hole 40a and a second link connection hole 40b opening in the vehicle width direction of the upper swing body 6.

When viewed in the vehicle width direction of the upper swing body 6, the bucket connection hole 40a overlaps the third penetration hole 36a of the bucket support member 36. The bucket 40 is supported turnably around a central axis O3 of the third pin 38 (refer to FIG. 4) due to the third pin 38 inserted through the third penetration hole 36a of the bucket support member 36 and the bucket connection hole 40a of the bucket 40.

In the posture in FIG. 2, the second link connection hole 40b is disposed at a position separated downward and rearward from the bucket connection hole 40a.

<First Electric Cylinder>

As illustrated in FIG. 2, the first electric cylinder 100A is disposed on the boom base end portion side of the boom partitioning member 25. The first electric cylinder 100A includes a first cylinder main body 103A constituted to be able to extend and retract in the boom extending direction, a first motor 101A serving as a driving source, and a first power transmission unit 102A transmitting a driving force of the first motor 101A to the first cylinder main body 103A.

The first cylinder main body 103A and the first motor 101A extend parallel to each other. A first end portion of the first cylinder main body 103A is connected to a pin 51 inserted through the first hole 15a of the bracket 15. The first electric cylinder 100A is supported by the upper swing body 6 via the bracket 15 so as to be able to turn around a central axis of the pin 51 extending in the width direction of the upper swing body 6.

A second end portion of the first cylinder main body 103A is connected to a pin 52 inserted through the first cylinder base end side hole 21a of the boom 20. The first electric cylinder 100A is supported by the boom 20 so as to be able to turn around a central axis of the pin 52 extending in the width direction of the upper swing body 6.

The first motor 101A is disposed on the second end portion side of the first cylinder main body 103A. The first motor 101A is disposed on the inward side of the first cylinder main body 103A in the boom plate width direction. The first motor 101A causes the first cylinder main body 103A to operate with a battery (not illustrated) provided in the upper swing body 6 serving as a power source. The boom 20 turns around the central axis O1 of the first pin 28 (refer to FIG. 3) with respect to the upper swing body 6 due to the first cylinder main body 103A extending and retracting in response to driving of the first motor 101A.

A first wiring 61 extends from the first motor 101A. The first wiring 61 extends along the boom base end side connection plate 23 and leads to the inside of the bracket 15. The first wiring 61 is connected to a battery (not illustrated) through the inside of the bracket 15.

<Second Electric Cylinder>

The second electric cylinder 100B is disposed on the boom distal end portion side of the boom partitioning member 25. The second electric cylinder 100B includes a second cylinder main body 103B constituted to be able to extend and retract in the boom extending direction, a second motor 101B serving as a driving source, and a second power transmission unit 102B transmitting a driving force of the second motor 101B to the second cylinder main body 103B.

The second cylinder main body 103B and the second motor 101B extend parallel to each other. A first end portion of the second cylinder main body 103B is connected to a pin 53 inserted through the second cylinder base end side hole 21b of the boom 20. The second electric cylinder 100B is supported by the boom 20 so as to be able to turn around a central axis of the pin 53 extending in the width direction of the upper swing body 6 with respect to the boom 20.

A second end portion of the second cylinder main body 103B is connected to a pin 54 inserted through the second cylinder distal end side hole 31a of the arm 30. The second electric cylinder 100B is supported by the arm 30 so as to be able to turn around a central axis of the pin 54 extending in the width direction of the upper swing body 6 with respect to the arm 30.

The second motor 101B is disposed on the first end portion side of the second cylinder main body 103B. The second motor 101B is disposed on the inward side of the second cylinder main body 103B in the boom plate width direction. The second motor 101B causes the second cylinder main body 103B to operate with a battery (not illustrated) provided in the upper swing body 6 serving as a power source. The arm 30 turns around the central axis O2 of the second pin 29 (refer to FIG. 3) with respect to the boom 20 due to the second cylinder main body 103B extending and retracting in response to driving of the second motor 101B.

A second wiring 62 extends from the second motor 101B. The second wiring 62 extends toward the first motor 101A and then extends along the boom base end side connection plate 23 together with the first wiring 61, thereby leading to the inside of the bracket 15. The second wiring 62 is connected to a battery (not illustrated) through the inside of the bracket 15.

<Third Electric Cylinder>

The third electric cylinder 100C is disposed on the arm distal end portion side of the arm partitioning member 34. The third electric cylinder 100C includes a third cylinder main body 103C constituted to be able to extend and retract in the arm extending direction, a third motor 101C serving as a driving source, and a third power transmission unit 102C transmitting a driving force of the third motor 101C to the third cylinder main body 103C.

The third cylinder main body 103C and the third motor 101C extend parallel to each other. A first end portion of the third cylinder main body 103C is connected to a pin 55 inserted through the third cylinder base end side hole 31b of the arm 30. The third electric cylinder 100C is supported by the arm 30 so as to be able to turn around a central axis of the pin 55 extending in the width direction of the upper swing body 6 with respect to the arm 30.

A second end portion of the third cylinder main body 103C is connected to a first end portion of the first link member 41. The first end portion of the first link member 41 has a first link hole 41a opening in the width direction of the upper swing body 6. The second end portion of the third cylinder main body 103C is connected to a pin 56 inserted through the first link hole 41a. The third electric cylinder 100C supports the first link member 41 so as to be able to turn around a central axis of the pin 56 extending in the width direction of the upper swing body 6 with respect to the first link member 41.

A second end portion of the first link member 41 has a second link hole 41b opening in the width direction of the upper swing body 6. A pin 57 is inserted through the second link hole 41b together with the first link connection hole 37a of the arm 30. The first link member 41 is supported by the arm 30 so as to be able to turn around a central axis of the pin 57 extending in the width direction of the upper swing body 6 with respect to the arm 30.

The second end portion of the third cylinder main body 103C is connected to a first end portion of a second link member 42. The first end portion of the second link member 42 has a third link hole 42a opening in the width direction of the upper swing body 6. The second end portion of the third cylinder main body 103C is connected to the pin 56 inserted through the third link hole 42a together with the first link hole 41a. The second link member 42 is provided turnably around the central axis of the pin 56 extending in the width direction of the upper swing body 6 with respect to the second end portion of the third cylinder main body 103C and the first end portion of the first link member 41.

A second end portion of the second link member 42 has a fourth link hole 42b penetrating it in the width direction of the upper swing body 6. A pin 58 is inserted through the fourth link hole 42b together with the second link connection hole 40b of the bucket 40. The second link member 42 is provided turnably around a central axis of the pin 58 extending in the width direction of the upper swing body 6 with respect to the bucket 40.

The third motor 101C is disposed on the first end portion side of the third cylinder main body 103C. The third motor 101C is disposed on the inward side of the third cylinder main body 103C in the arm plate width direction. The third motor 101C causes the third cylinder main body 103C to operate with a battery (not illustrated) provided in the upper swing body 6 serving as a power source. The bucket 40 turns around the central axis O3 of the third pin 38 (refer to FIG. 4) with respect to the arm 30 due to the third cylinder main body 103C extending and retracting in response to driving of the third motor 101C.

A third wiring 63 extends from the third motor 101C. The third wiring 63 extends toward the boom 20 and then passes through the opening portion 24a of the boom distal end side connection plate 24 (refer to FIG. 3). Thereafter, the third wiring 63 extends toward the first motor 101A and then extends along the boom base end side connection plate 23 together with the first wiring 61 and the second wiring 62, thereby leading to the inside of the bracket 15. The third wiring 63 is connected to a battery (not illustrated) through the inside of the bracket 15.

<Electric Cylinder>

Figure 5:
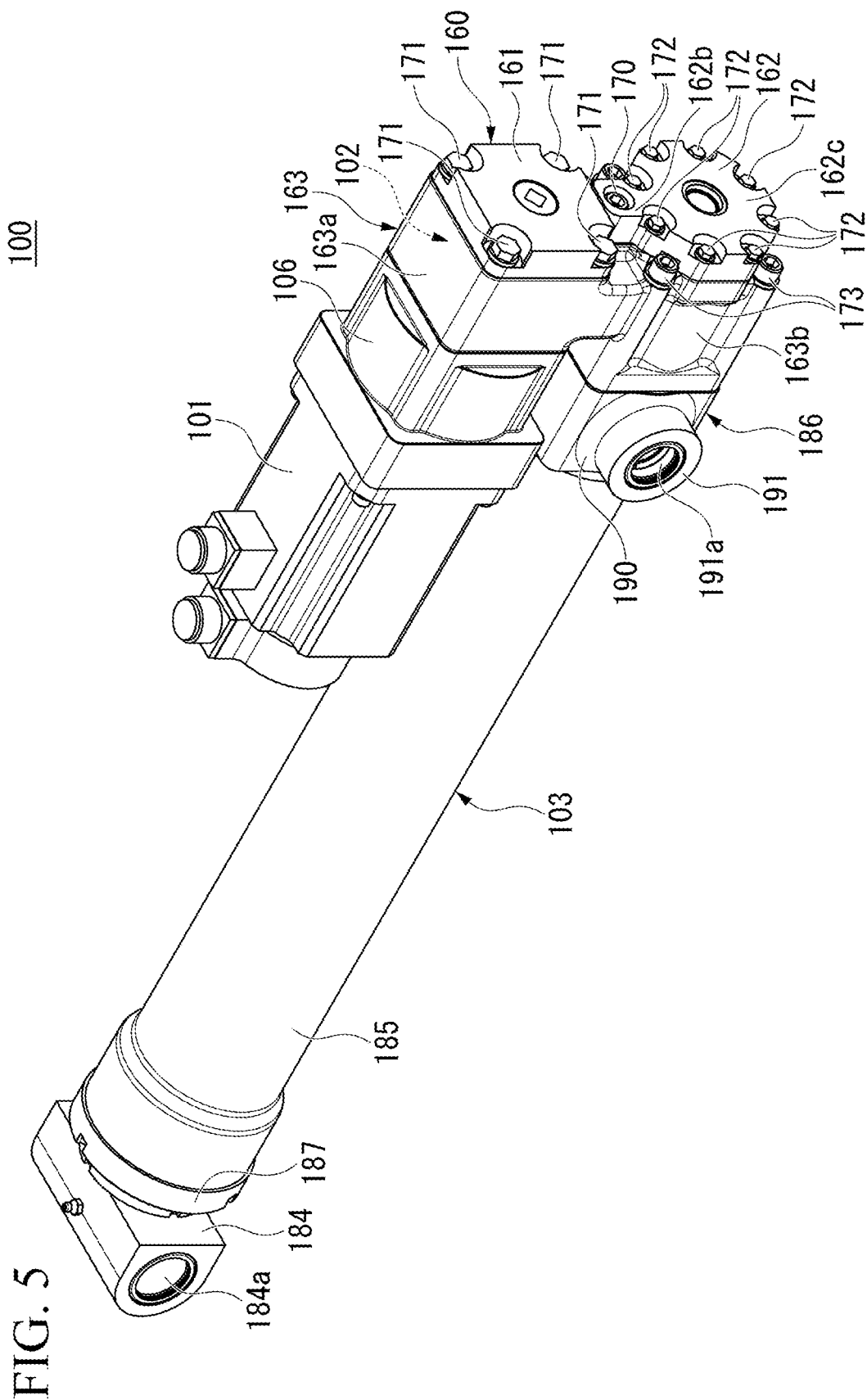
FIG. 5 is a perspective view of an electric cylinder according to the embodiment.

As illustrated in FIG. 1, the first electric cylinder 100A, the second electric cylinder 100B, and the third electric cylinder 100C are electric cylinders 100 common to each other. As illustrated in FIG. 5, the electric cylinder 100 includes a motor 101, a power transmission unit 102, and a cylinder main body 103.

Figure 8:
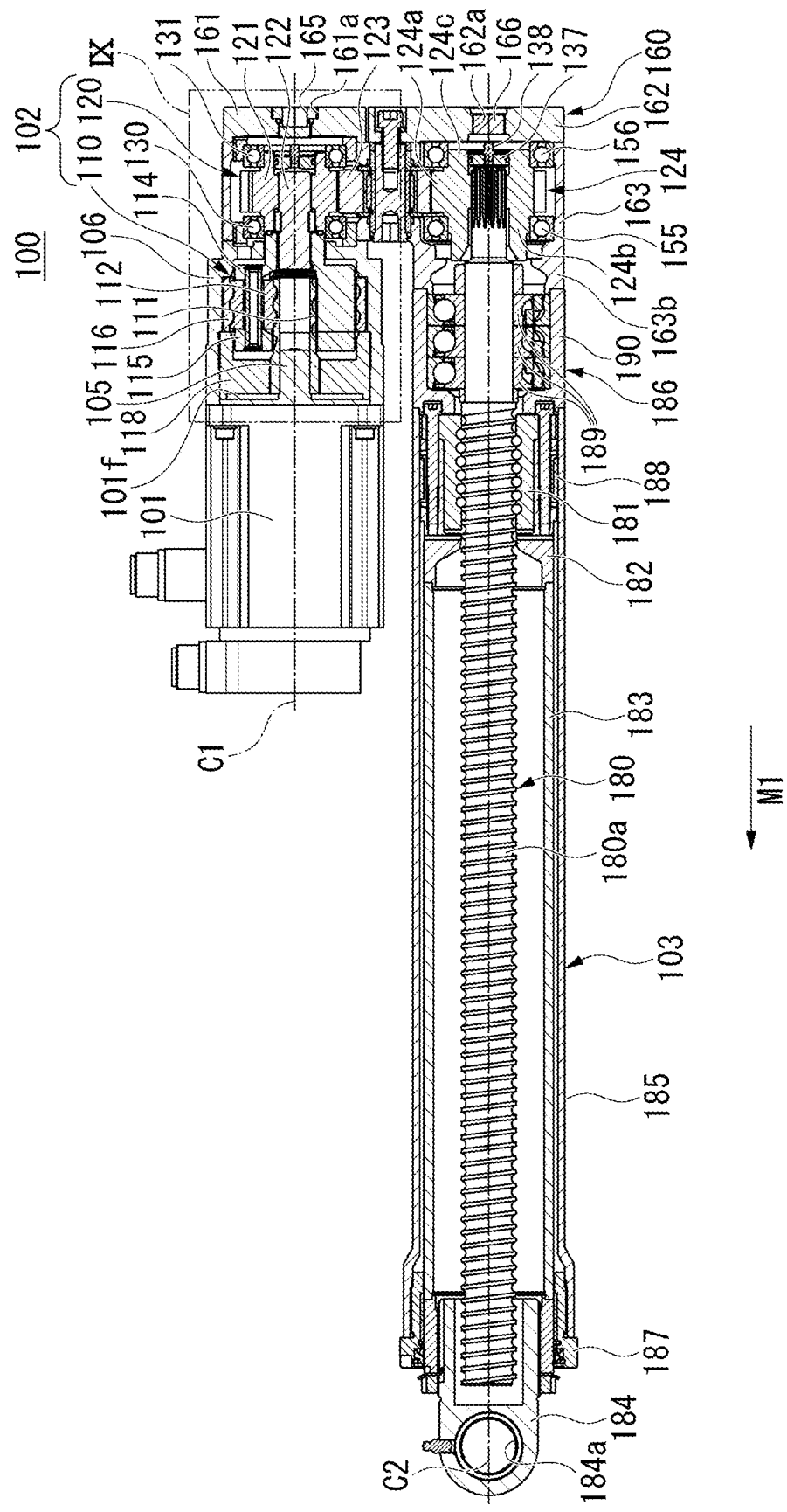
FIG. 8 is a view including a cross section along VIII-VIII in FIG. 7.

The motor 101 is a driving source for the electric cylinder 100. For example, the motor 101 is a servo motor. As illustrated in FIG. 8, the motor 101 and the cylinder main body 103 extend parallel to each other. The motor 101 and the cylinder main body 103 are arranged with a gap therebetween.

The electric cylinder 100 has an output shaft 105 rotating in response to driving of the motor 101. The output shaft 105 is provided coaxially with the central axis of the motor 101. The output shaft 105 protrudes outward in an axial direction from an end surface 101f of the motor 101 in the axial direction. In the diagrams, the sign C1 indicates a motor axis along the central axis of the motor 101.

The power transmission unit 102 transmits a driving force of the motor 101 to a piston 182. The power transmission unit 102 includes a planetary gear mechanism 110 for shifting a driving force of the output shaft 105 (for example, deceleration), and a transmission gear mechanism 120 for transmitting a driving force shifted by the planetary gear mechanism 110 to the piston 182.

<Planetary Gear Mechanism>

Figure 9:
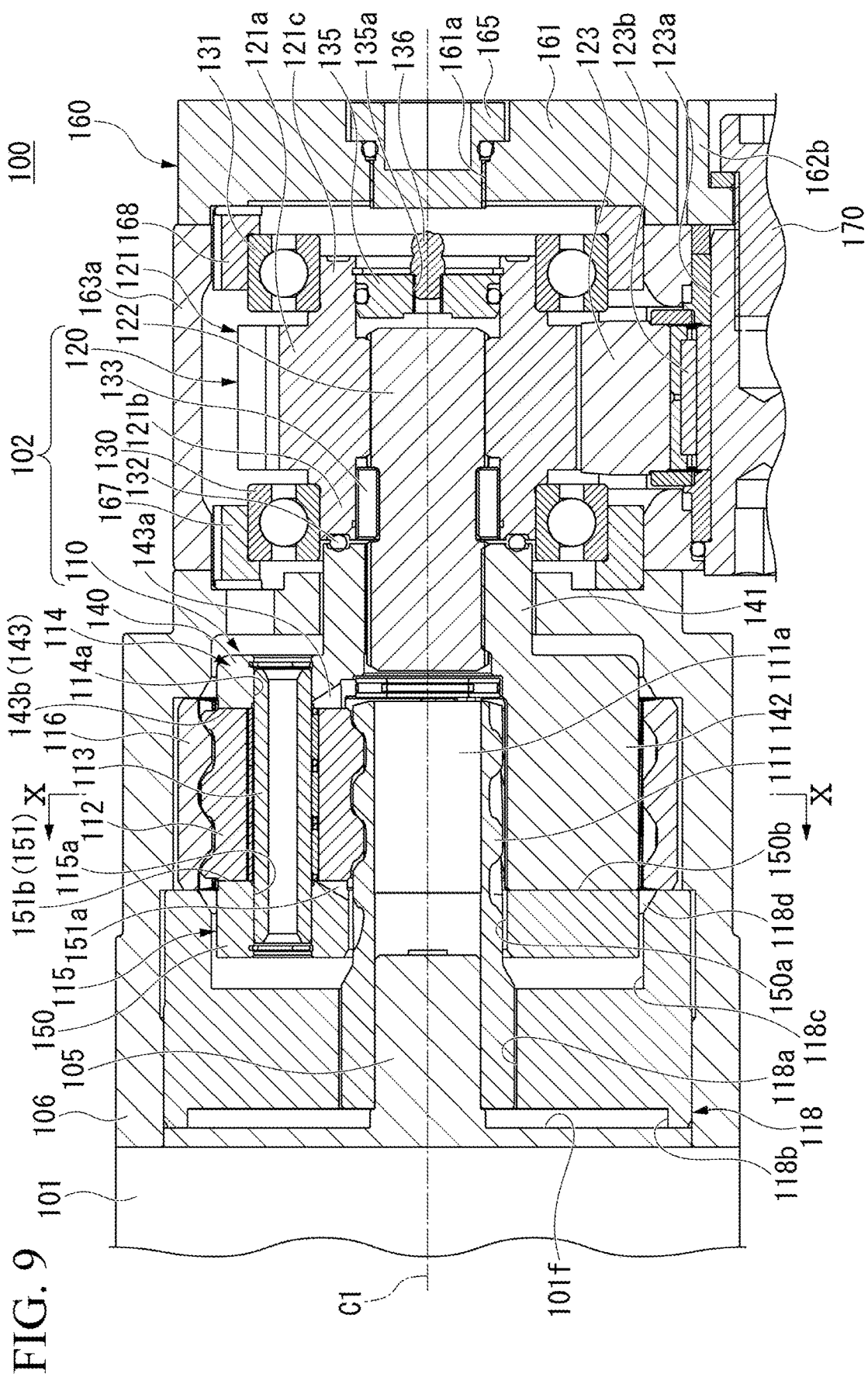
FIG. 9 is an enlarged view of IX part in FIG. 8.

As illustrated in FIG. 9, the planetary gear mechanism 110 includes a sun gear 111 (first rotor) joined to the output shaft 105, a plurality of planetary gears 112 (second rotors) disposed adjacent to the sun gear 111, carriers 114 and 115 rotatably supporting central shafts 113 of the plurality of planetary gears 112 (which will hereinafter be referred to as "planetary shafts 113"), and a ring gear 116 surrounding the plurality of planetary gears 112. The planetary gear mechanism 110 is covered by a case 106 having a cylindrical shape disposed adjacent to the end surface 101f of the motor 101 in the axial direction.

<Sun Gear>

The sun gear 111 rotates in response to rotation of the output shaft 105. The sun gear 111 is formed to have a cylindrical shape which is coaxial with the output shaft 105. A length of the sun gear 111 in the axial direction is longer than a length of the output shaft 105 protruding from the end surface 101f of the motor 101 in the axial direction. The base end portion of the sun gear 111 in the axial direction (end portion on the motor 101 side) is separated from the end surface 101f of the motor 101 in the axial direction. The base end portion of the sun gear 111 in the axial direction has a larger diameter than the distal end portion of the sun gear 111 in the axial direction (end portion on a side opposite to the motor 101).

The sun gear 111 has an open hollow portion 111a capable of accommodating a lubricant therein. The hollow portion 111a opens outward in the axial direction. The hollow portion 111a is a space surrounded by the distal end portion of the output shaft 105 in the axial direction and an inner circumferential surface of the sun gear 111. The hollow portion 111a is provided throughout a part between the distal end portion of the output shaft 105 in the axial direction and the distal end portion of the sun gear 111 in the axial direction.

<Planetary Gear>

Figure 10:
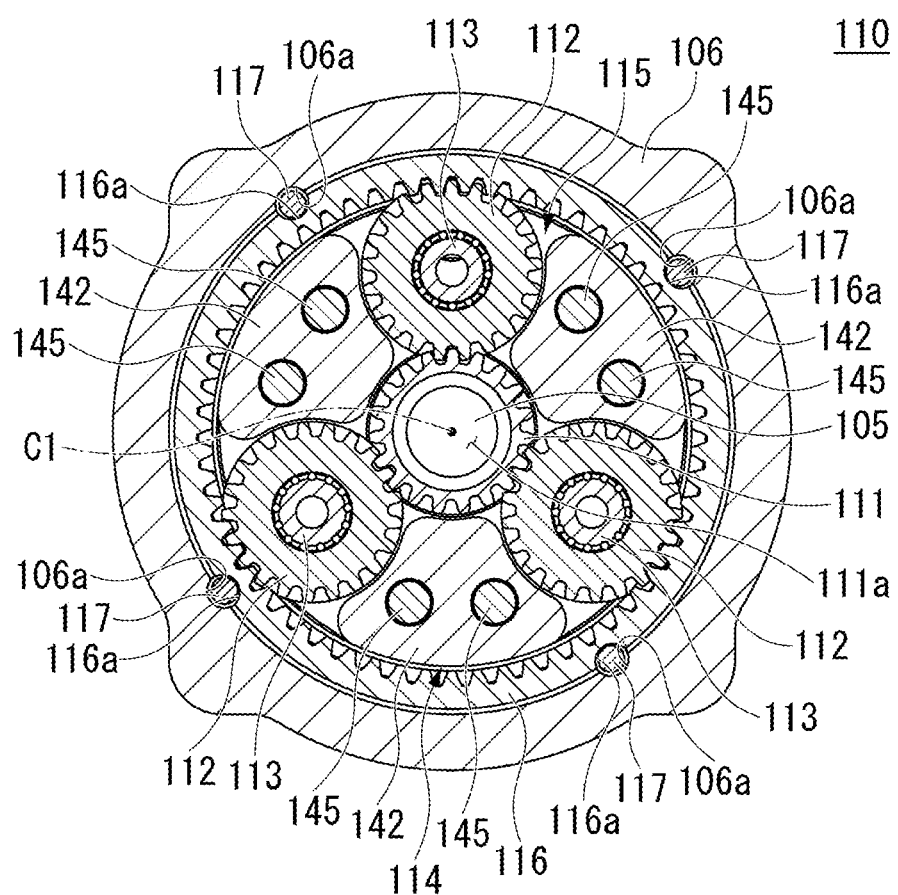
FIG. 10 is a view including a cross section along X-X in FIG. 9.

The planetary gears 112 rotate in response to rotation of the sun gear 111. As illustrated in FIG. 10, a plurality of (for example, three in the present embodiment) planetary gears 112 are disposed away from each other at equal intervals in a circumferential direction of the sun gear 111. Outer teeth provided in outer circumferences of the planetary gears 112 are meshed with outer teeth provided in an outer circumference of the sun gear 111. The planetary gears 112, which have been meshed with the sun gear 111, rotate on their axes and revolve about the sun gear 111. The planetary gears 112 can rotate around the planetary shafts 113 extending parallel to the output shaft 105.

<Carrier>

As illustrated in FIG. 9, the carriers 114 and 115 are provided coaxially with the output shaft 105. The carriers 114 and 115 support both end portions of the planetary shafts 113 in the axial direction. The carriers 114 and 115 have guide grooves 143a and 151a extending from positions facing the outer circumference of the sun gear 111 toward the planetary shafts 113 and recessed so as to allow a lubricant to circulate therein.

The carriers 114 and 115 are constituted of a first carrier 114 disposed on the distal end portion side of the output shaft 105 in the axial direction, and a second carrier 115 disposed on a central side of the output shaft 105 in the axial direction. As illustrated in FIG. 10, the first carrier 114 and the second carrier 115 are joined to each other using a plurality of (for example, six in the present embodiment) bolts 145.

<First Carrier>

Figure 11:
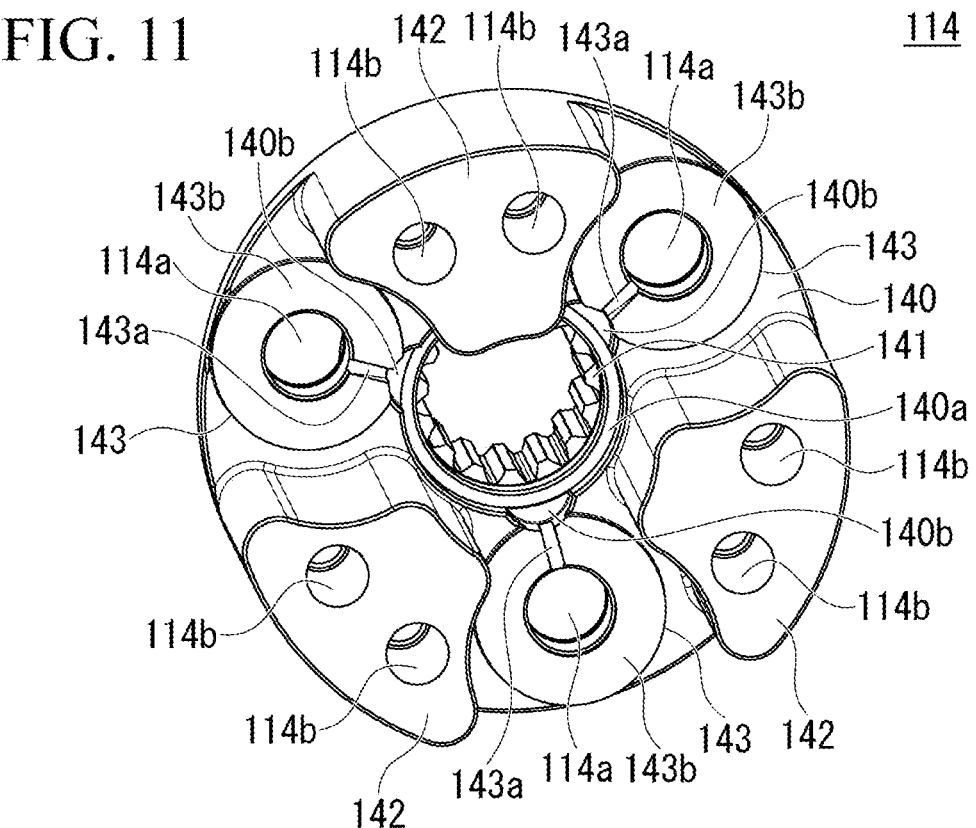
FIG. 11 a perspective view of a first carrier according to the embodiment.

As illustrated in FIG. 11, the first carrier 114 has first axis holes 114a opening such that the planetary shafts 113 can be inserted therethrough, and first bolt holes 114b opening such that the bolts 145 (refer to FIG. 10) can be inserted therethrough. The first carrier 114 includes a first carrier base portion 140 having an annular shape, a carrier distal end cylinder body 141 (refer to FIG. 9) having a cylindrical shape protruding outward in the axial direction from the first carrier base portion 140, a plurality of carrier wall portions 142 extending inward in the axial direction (a direction opposite to the direction in which the carrier distal end cylinder body 141 protrudes) from the first carrier base portion 140, and first groove formation portions 143 provided between two carrier wall portions 142 adjacent to each other in the circumferential direction. The first carrier base portion 140, the carrier distal end cylinder body 141, the carrier wall portions 142, and the first groove formation portions 143 are integrally formed of the same member.

As illustrated in FIG. 9, an outer diameter of the first carrier base portion 140 is larger than an outer diameter of the carrier distal end cylinder body 141. An outer circumferential edge of the first carrier base portion 140 is separated to the inward side in a radial direction from an inner circumferential surface of the case 106.

As illustrated in FIG. 11, the first carrier base portion 140 has an annular groove 140a disposed at a position facing the distal end portion of the output shaft 105 in the axial direction, and a plurality of relay grooves 140b leading to the annular groove 140a. The annular groove 140a is formed to have an annular shape along an inner circumference of the first carrier base portion 140. The relay grooves 140b are curved outward in the radial direction from an outer circumferential edge of the annular groove 140a.

A plurality of (for example, three in the present embodiment) carrier wall portions 142 are disposed away from each other at equal intervals in the circumferential direction of the first carrier base portion 140. The carrier wall portions 142 are provided throughout a part between the outer circumferential edge of the annular groove 140a and the outer circumferential edge of the first carrier base portion 140. When viewed in the axial direction, each of the carrier wall portions 142 has an external shape sticking out in the circumferential direction of the first carrier base portion 140 toward the outward side of the first carrier base portion 140 in the radial direction. Side surfaces of the carrier wall portions 142 in the circumferential direction of the first carrier base portion 140 are curved in an arc shape along the external shapes of the first groove formation portions 143. Two first bolt holes 114b are provided for each of the carrier wall portions 142.

A plurality of (for example, three in the present embodiment) first groove formation portions 143 are disposed away from each other at equal intervals in the circumferential direction of the first carrier base portion 140. The first groove formation portions 143 are away from each other at equal intervals with respect to the side surfaces of two carrier wall portions 142 adjacent to each other in the circumferential direction. The first groove formation portions 143 are provided at positions overlapping the planetary gears 112 when viewed in the axial direction.

Each of the first groove formation portions 143 has a first guide groove 143a recessed so as to allow a lubricant to circulate therein. When viewed in the axial direction, the first guide groove 143a is formed on an imaginary line connecting a central axis of the carrier distal end cylinder body 141 and a central axis of the first axis hole 114a. As illustrated in FIG. 9, the first guide groove 143a extends from a position facing the distal end portion of the sun gear 111 in the axial direction toward the first axis hole 114a. As illustrated in FIG. 11, the first guide groove 143a is disposed between the first axis hole 114a and the relay groove 140b. The depth of the first guide groove 143a gradually increases from the first axis hole 114a side toward the relay groove 140b.

Each of the first groove formation portions 143 has a first receiving surface 143b receiving an outer end surface of the planetary gear 112 in the axial direction. When viewed in the axial direction, the first receiving surface 143b is formed to have a C-shape opening in a part of the first guide groove 143a. The first receiving surface 143b is constituted to be able to come into contact with the outer end surface of the planetary gear 112 in the axial direction in a part other than the first guide groove 143a. An inner circumferential edge of the first receiving surface 143b is separated to the outward side in the radial direction from an outer circumferential edge of the first axis hole 114a.

<Second Carrier>

Figure 12:
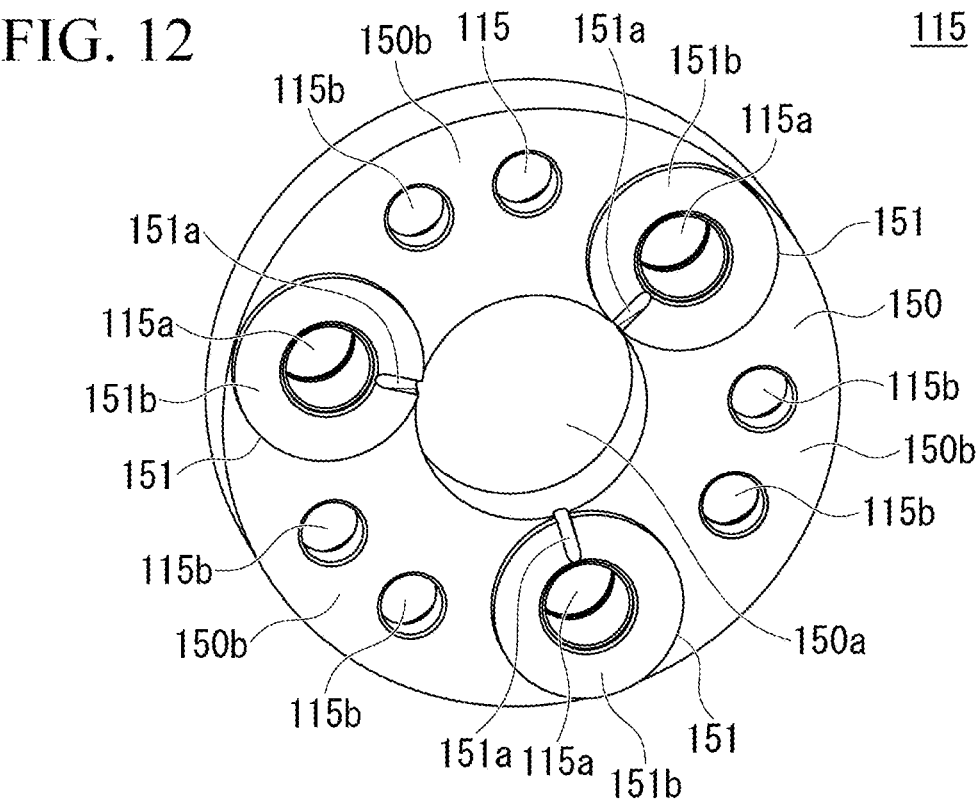
FIG. 12 is a perspective view of a second carrier according to the embodiment.

As illustrated in FIG. 12, the second carrier 115 has second axis holes 115a opening such that the planetary shafts 113 can be inserted therethrough, and second bolt holes 115b opening such that the bolts 145 (refer to FIG. 10) can be inserted therethrough. The second carrier 115 includes a second carrier base portion 150 having an annular shape, and second groove formation portions 151 provided at positions facing the first groove formation portions 143 (refer to FIG. 11) in the axial direction. The second carrier base portion 150 and the second groove formation portions 151 are integrally formed of the same member.

As illustrated in FIG. 9, an outer diameter of the second carrier base portion 150 is substantially the same as the outer diameter of the first carrier base portion 140. An outer circumferential edge of the second carrier base portion 150 is separated to the inward side in the radial direction from the inner circumferential surface of the case 106.

The second carrier base portion 150 has an opening portion 150a opening such that the output shaft 105 can be inserted therethrough. The second carrier base portion 150 has wall receiving portions 150b receiving the carrier wall portions 142 of the first carrier 114.

The wall receiving portions 150b are provided at positions overlapping the carrier wall portions 142 when viewed in the axial direction. As illustrated in FIG. 12, a plurality of (for example, three in the present embodiment) wall receiving portions 150b are provided correspondingly to the carrier wall portions 142. Two second bolt holes 115b are provided for each of the wall receiving portions 150b.

A plurality of (for example, three in the present embodiment) second groove formation portions 151 are disposed away from each other at equal intervals in the circumferential direction of the second carrier base portion 150. The second groove formation portions 151 are provided at positions overlapping the planetary gears 112 when viewed in the axial direction.

Each of the second groove formation portions 151 has a second guide groove 151a recessed so as to allow a lubricant to circulate therein. When viewed in the axial direction, the second guide groove 151a is formed on an imaginary line connecting the center of the opening portion 150a and a central axis of the second axis hole 115a. As illustrated in FIG. 9, the second guide groove 151a extends from a position facing the outer circumference of the sun gear 111 toward the second axis hole 115a. As illustrated in FIG. 12, the second guide groove 151a is disposed between the second axis hole 115a and the opening portion 150a. The depth of the second guide groove 151a gradually increases from the second axis hole 115a side toward the opening portion 150a.

Each of the second groove formation portions 151 has a second receiving surface 151b receiving an inner end surface of the planetary gear 112 in the axial direction. When viewed in the axial direction, the second receiving surface 151b is formed to have a C-shape opening in a part of the second guide groove 151a. The second receiving surface 151b is constituted to be able to come into contact with the inner end surface of the planetary gear 112 in the axial direction in a part other than the second guide groove 151a. An inner circumferential edge of the second receiving surface 151b is separated to the outward side in the radial direction from an outer circumferential edge of the second axis hole 115a.

<Ring Gear>

As illustrated in FIG. 10, inner teeth provided in an inner circumference of the ring gear 116 are meshed with outer teeth provided in each of the outer circumferences of the planetary gears 112. An outer circumferential surface of the ring gear 116 is provided with a plurality of gear side recessed portions 116a into which locking pins 117 are inserted. A plurality of (for example, four in the present embodiment) gear side recessed portions 116a are away from each other at equal intervals in the circumferential direction.

The inner circumferential surface of the case 106 is provided with a plurality of case side recessed portions 106a in which the locking pins 117 are inserted. A plurality of (for example, four in the present embodiment) case side recessed portions 106a are away from each other at equal intervals in the circumferential direction. For example, the ring gear 116 can be locked (movement of the ring gear 116 in the circumferential direction with respect to the case 106 can be restricted) by inserting the locking pins 117 through the inside of the respective recessed portions 106a and 116a in a state in which positions of the gear side recessed portions 116a and the case side recessed portions 106a in the circumferential direction are aligned with each other.

<Spacer>

As illustrated in FIG. 9, the electric cylinder 100 includes a spacer 118 disposed between the end surface 101f of the motor 101 in the axial direction and the carriers 114 and 115. The spacer 118 has a penetration hole 118a opening in the axial direction of the motor 101 with a gap with respect to an outer circumferential edge of the sun gear 111 (an outer end edge in the radial direction). The gap of the penetration hole 118a is formed to have a size such that a lubricant can circulate therein. The spacer 118 has an inner recessed portion 118b opening inward in the axial direction at a position facing the end surface 101f of the motor 101 in the axial direction, and an outer recessed portion 118c opening outward in the axial direction such that the second carrier 115 can be accommodated therein.

The penetration hole 118a allows center portions of the inner recessed portion 118b and the outer recessed portion 118c in the radial direction (parts on the sun gear 111 side) to communicate with each other in the axial direction. An inner end portion of the penetration hole 118a in the axial direction leads to the center portion of the inner recessed portion 118b in the radial direction. An outer end portion of the penetration hole 118a in the axial direction leads to the center portion of the outer recessed portion 118c in the radial direction. An outer diameter of the inner recessed portion 118b is larger than an outer diameter of the outer recessed portion 118c. An outer circumferential edge of the outer recessed portion 118c is separated to the outward side in the radial direction from an outer circumferential edge of the second carrier 115.

The spacer 118 has a spacer side groove 118d extending from an inner circumferential edge of the outer recessed portion 118c toward an inner end portion of the ring gear 116 in the axial direction and recessed so as to allow a lubricant to circulate therein. The depth of the spacer side groove 118d gradually increases from the inner circumferential edge side of the outer recessed portion 118c toward the inner end portion of the ring gear 116 in the axial direction.

<Transmission Gear Mechanism>

As illustrated in FIG. 8, the transmission gear mechanism 120 includes a transfer gear 121 transmitting rotational forces of the carriers 114 and 115 to the piston 182, a transfer shaft 122 extending outward in the axial direction from a position facing an outer end of the sun gear 111 in the axial direction, an idler gear 123 disposed adjacent to the transfer gear 121, and a driven gear 124 disposed on a side opposite to the transfer gear 121 with the idler gear 123 sandwiched therebetween. The transmission gear mechanism 120 is covered by a cover unit 160 disposed adjacent to the case 106.

As illustrated in FIG. 9, the transfer gear 121 is provided coaxially with the output shaft 105. The transfer gear 121 is formed to have a cylindrical shape opening such that the transfer shaft 122 can be inserted therethrough. The transfer gear 121 includes a gear main body 121a having a cylindrical shape with outer teeth meshed with the idler gear 123, an inner cylinder body 121b protruding inward in the axial direction from the gear main body 121a, and an outer cylinder body 121c protruding outward in the axial direction from the gear main body 121a. The gear main body 121a, the inner cylinder body 121b, and the outer cylinder body 121c are integrally formed of the same member. The transfer gear 121 is supported by an inner bearing 130 provided in an outer circumference of the inner cylinder body 121b and an outer bearing 131 provided in an outer circumference of the outer cylinder body 121c such that it can rotate around the motor axis C1 with respect to the cover unit 160.

The transfer shaft 122 is provided coaxially with the output shaft 105. The carrier distal end cylinder body 141 is coupled to a first end portion side of the transfer shaft 122 in the axial direction using a spline. An inner circumference of the carrier distal end cylinder body 141 is provided with inner teeth having a tooth surface parallel to the axial direction of the carrier distal end cylinder body 141. An outer circumference of the first end portion side of the transfer shaft 122 in the axial direction is provided with outer teeth having a tooth surface parallel to the axial direction of the transfer shaft 122 and meshed with the inner teeth of the carrier distal end cylinder body 141. A gap in which a lubricant can circulate is formed between the outer teeth on the first end portion side of the transfer shaft 122 in the axial direction and the inner teeth of the carrier distal end cylinder body 141.

The gear main body 121a of the transfer gear 121 is coupled to the second end portion side of the transfer shaft 122 in the axial direction using a spline. An inner circumference of the gear main body 121a is provided with inner teeth having a tooth surface parallel to the axial direction of the transfer gear 121. An outer circumference of the second end portion side of the transfer shaft 122 in the axial direction is provided with outer teeth having a tooth surface parallel to the axial direction of the transfer shaft 122 and meshed with the inner teeth of the gear main body 121a. A gap in which a lubricant can circulate is formed between the outer teeth on the second end portion side of the transfer shaft 122 in the axial direction and the inner teeth of the gear main body 121a.

An inner end portion of the inner cylinder body 121b in the axial direction is connected to a distal end portion of the carrier distal end cylinder body 141 with an O-ring 132 therebetween. A bearing 133 is provided between an inner circumference of the inner cylinder body 121b and an outer circumference of a center portion of the transfer shaft 122 in the axial direction. For example, the bearing 133 is constituted of a pair of semicircular arc-shaped rings (so-called halved rings). A gap in which a lubricant can circulate is formed between the center portion of the transfer shaft 122 in the axial direction and the bearing 133.

A cover member 135 is detachably attached to the outer cylinder body 121c. The cover member 135 has an open supply hole 135a capable of supplying a lubricant to the second end portion side of the transfer shaft 122 in the axial direction from the outside. The supply hole 135a is formed on the motor axis C1. A gap in which a lubricant can circulate is formed between an outer end portion of the transfer shaft 122 in the axial direction and the cover member 135.

A grease nipple 136 capable of being opened and closed so as to allow a lubricant to be supplied to the supply hole 135a from the outside is provided in the cover member 135. The grease nipple 136 is provided on the motor axis C1. The grease nipple 136 extends outward in the axial direction beyond the cover member 135. The grease nipple 136 has a lubricant injection port (not illustrated) leading to the supply hole 135a. The grease nipple 136 has a check valve in which beads are pressed against the injection port from the inside by a spring. The grease nipple 136 can be opened and a lubricant can be supplied to the supply hole 135a through the injection port by connecting a grease gun or the like to the grease nipple 136 and applying a pressure thereto, for example.

The idler gear 123 rotates in response to rotation of the transfer gear 121. The idler gear can rotate around an idler shaft 123a extending parallel to the transfer shaft 122. The idler gear 123 is formed to have a cylindrical shape opening such that the idler shaft 123a can be inserted therethrough. A bearing 123b is provided between an inner circumference of the idler gear 123 and an outer circumference of the idler shaft 123a.

As illustrated in FIG. 8, the driven gear 124 is disposed adjacent to the idler gear 123. The driven gear 124 rotates in response to rotation of the idler gear 123. The driven gear 124 is provided coaxially with a cylinder shaft 180 accommodated inside the cylinder main body 103. In the diagrams, the sign C2 indicates a cylinder axis along the cylinder shaft 180.

The driven gear 124 is formed to have a cylindrical shape opening such that a first end portion of the cylinder shaft 180 can be inserted therethrough. The driven gear 124 includes a gear main body 124a having a cylindrical shape with outer teeth meshed with the idler gear 123, an inner cylinder body 124b protruding inward in the axial direction from the gear main body 124a, and an outer cylinder body 124c protruding outward in the axial direction from the gear main body 124a. The gear main body 124a, the inner cylinder body 124b, and the outer cylinder body 124c are integrally formed of the same member.

The driven gear 124 is supported by an inner bearing 155 provided in an outer circumference of the inner cylinder body 124b and an outer bearing 156 provided in an outer circumference of the outer cylinder body 124c such that it can rotate around the cylinder axis C2 with respect to the cover unit 160.

In the diagrams, the sign 137 indicates a cover member provided such that it can be attached and detached with respect to the outer cylinder body 124c, and the sign 138 indicates a grease nipple provided in the cover member 137 and capable of being opened and closed so as to allow a lubricant to be supplied to a supply hole from the outside with respect to the cover member 137, respectively.

<Cover Unit>

The cover unit 160 includes a first cover 161 covering the transfer gear 121 from a side outward in the axial direction, a second cover 162 covering the driven gear 124 from a side outward in the axial direction, and a third cover 163 covering the transfer gear 121, the idler gear 123, and the driven gear 124 from a side outward in the radial direction of each of the gears.

Figure 7:
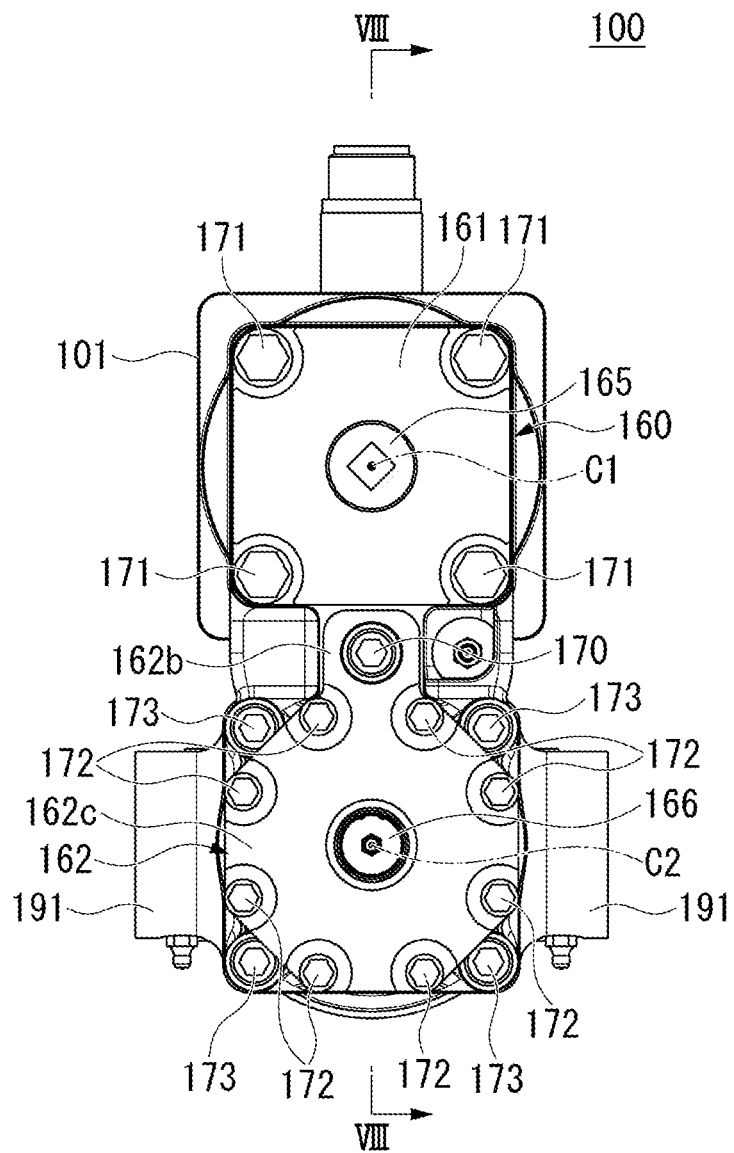
FIG. 7 is a view of the electric cylinder according to the embodiment viewed from the other side in the axial direction.

As illustrated in FIG. 7, the first cover 161 has a rectangular shape when viewed in the axial direction. As illustrated in FIG. 9, the first cover 161 has an open first supply opening 161a capable of supplying a lubricant to the second end portion side of the transfer shaft 122 in the axial direction from the outside. The first supply opening 161a is formed on the motor axis C1. A gap in which a lubricant can circulate is formed between an outer end portion of the transfer gear 121 in the axial direction and the first cover 161. A first lid member 165 is detachably attached to the first cover 161 such that the first supply opening 161a can be opened and closed.

As illustrated in FIG. 8, the second cover 162 has an open second supply opening 162a capable of supplying a lubricant to the first end portion side of the cylinder shaft 180 from the outside. The second supply opening 162a is formed on the cylinder axis C2. A gap in which a lubricant can circulate is formed between the outer end portion of the driven gear 124 in the axial direction and the second cover 162. A second lid member 166 is detachably attached to the second cover 162 such that the second supply opening 162a can be opened and closed.

As illustrated in FIG. 7, when viewed in the axial direction, the second cover 162 includes an idler cover portion 162b provided at a position overlapping the idler gear 123, and a driven cover portion 162c provided at a position overlapping the driven gear 124. The idler cover portion 162b and the driven cover portion 162c are integrally formed of the same member. As illustrated in FIG. 9, the idler cover portion 162b fixes the idler shaft 123a using a bolt 170.

As illustrated in FIG. 5, the third cover 163 includes a case side cover portion 163a provided between the case 106 and the first cover 161, and a screw side cover portion 163b provided between the cylinder main body 103 and the second cover 162.

As illustrated in FIG. 9, the case side cover portion 163a opens coaxially with the motor axis C1. In the diagrams, the sign 167 indicates an inner spacer provided between an inner circumferential surface of an inner portion of the case side cover portion 163a in the axial direction and the inner bearing 130, and the sign 168 indicates an outer spacer provided between an inner circumferential surface of an outer portion of the case side cover portion 163a in the axial direction and the outer bearing 131, respectively.

As illustrated in FIG. 5, the first cover 161 is jointly fastened to the case 106 with the case side cover portion 163a therebetween using a plurality of (for example, four in the present embodiment) bolts 171. An inner end portion of the case side cover portion 163a in the axial direction is coupled to an outer end portion of the case 106 in the axial direction by jointly fastening the bolts 171.

The driven cover portion 162c is fixed to the screw side cover portion 163b using a plurality of (for example, eight in the present embodiment) bolts 172. The screw side cover portion 163b is fixed to the cylinder main body 103 using a plurality of (for example, four in the present embodiment) bolts 173.

<Cylinder Main Body>

As illustrated in FIG. 8, the cylinder main body 103 includes the cylinder shaft 180, a nut 181 screwed to a screw shaft 180a of the cylinder shaft 180, the piston 182 provided in an outer circumference of the nut 181, a piston rod 183 having a cylindrical shape joined to the piston 182, a joint member 184 provided in a distal end portion of the piston rod 183, a cylinder tube 185 having a cylindrical shape accommodating the piston rod 183, a holder 186 provided between a first end portion of the cylinder tube 185 and the screw side cover portion 163b, and a rod cover 187 provided in a second end portion of the cylinder tube 185.

Balls (not illustrated) are interposed between the screw shaft 180a and the nut 181. The screw shaft 180a and the nut 181 constitute a ball screw converting rotational motion of the motor 101 into rectilinear motion. The nut 181 is joined to the piston 182 using a plurality of bolts. The piston 182 is constituted to be able to move integrally with the nut 181 on the screw shaft 180a. The piston rod 183 is constituted to be able to move integrally with the piston 182 along the cylinder axis C2.

Figure 6:
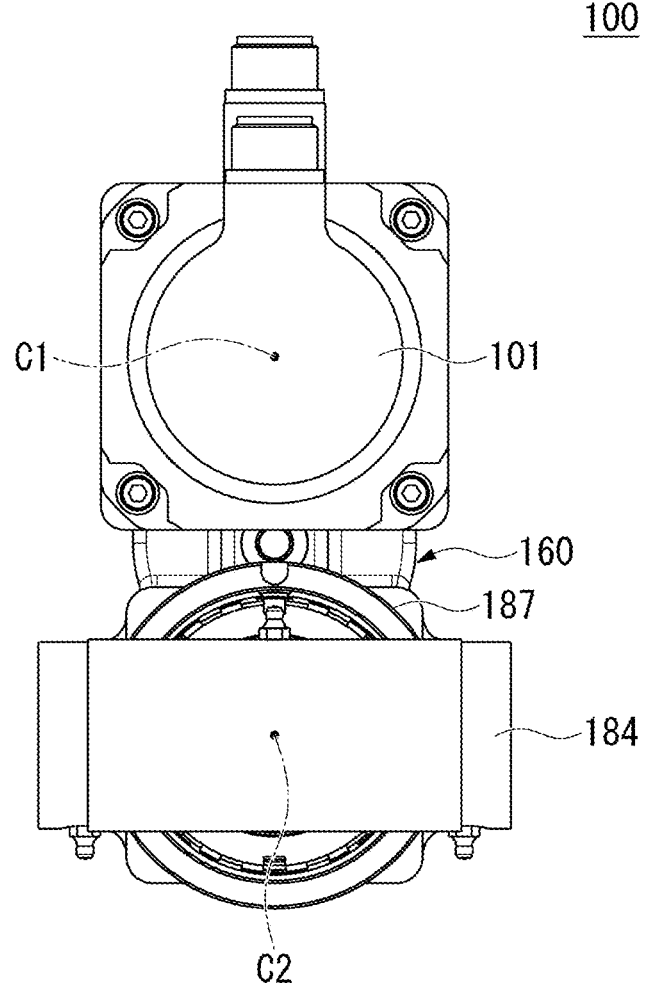
FIG. 6 is a view of the electric cylinder according to the embodiment viewed from one side in an axial direction.

As illustrated in FIG. 6, the joint member 184 protrudes outward beyond an outer circumferential edge of the rod cover 187. As illustrated in FIG. 8, the joint member 184 has a connection hole 184a opening in a direction orthogonal to the cylinder axis C2. A bearing 188 is provided between an inner circumferential surface of the cylinder tube 185 and an outer circumferential surface of the piston 182.

As illustrated in FIG. 5, the holder 186 includes a holder main body 190 having a cylindrical shape, and a trunnion portion 191 protruding outward in the radial direction from the holder main body 190.

As illustrated in FIG. 8, the holder main body 190 opens coaxially with the cylinder axis C2. A plurality of bearings 189 are provided between an inner circumferential surface of the holder main body 190 and the screw shaft 180a. As illustrated in FIG. 5, the trunnion portion 191 has a connection hole 191a opening in a direction orthogonal to the cylinder axis C2. The connection hole 191a of the trunnion portion 191 opens parallel to the connection hole 184a of the joint member 184.

<Operation of Electric Cylinder>

Hereinafter, an example of operation of the electric cylinder 100 will be described.

As illustrated in FIG. 8, a driving force from the motor 101 is decelerated through the power transmission unit 102 and is transmitted to the cylinder shaft 180. Specifically, a driving force from the motor 101 is a rotational force around the motor axis C1 and is decelerated by the output shaft 105, the sun gear 111, the plurality of planetary gears 112, and the carriers 114 and 115. A rotational force decelerated by the carriers 114 and 115 is transmitted to the transfer gear 121 through the transfer shaft 122. A rotational force transmitted to the transfer gear 121 is transmitted to the cylinder shaft 180 through the idler gear 123 and the driven gear 124.

For example, when the motor 101 is rotated forward, the cylinder shaft 180 rotates in one direction around the cylinder axis C2. In response to rotation of the cylinder shaft 180 in one direction, the nut 181 screwed to the screw shaft 180a of the cylinder shaft 180 moves on the cylinder axis C2 in an arrow M1 direction. Due to movement of the nut 181 in the arrow M1 direction, the piston 182, the piston rod 183, and the joint member 184 integrally move in the arrow M1 direction. Accordingly, the cylinder main body 103 extends.

On the other hand, if the motor 101 rotates backward in a state in which the cylinder main body 103 extends, the cylinder shaft 180 rotates in the other direction around the cylinder axis C2. In response to rotation of the cylinder shaft 180 in the other direction, the nut 181 screwed to the screw shaft 180a of the cylinder shaft 180 moves on the cylinder axis C2 in a direction opposite to the arrow M1 direction. Due to movement of the nut 181 in a direction opposite to the arrow M1 direction, the piston 182, the piston rod 183, and the joint member 184 integrally move in a direction opposite to the arrow M1 direction. Accordingly, the cylinder main body 103 retracts.

In this manner, the electric cylinder 100 is constituted such that the cylinder main body 103 extends and retracts due to forward and backward rotation of the motor 101.

<Flow of Lubricant>

Hereinafter, an example of a flow of a lubricant will be described.

Figure 13:
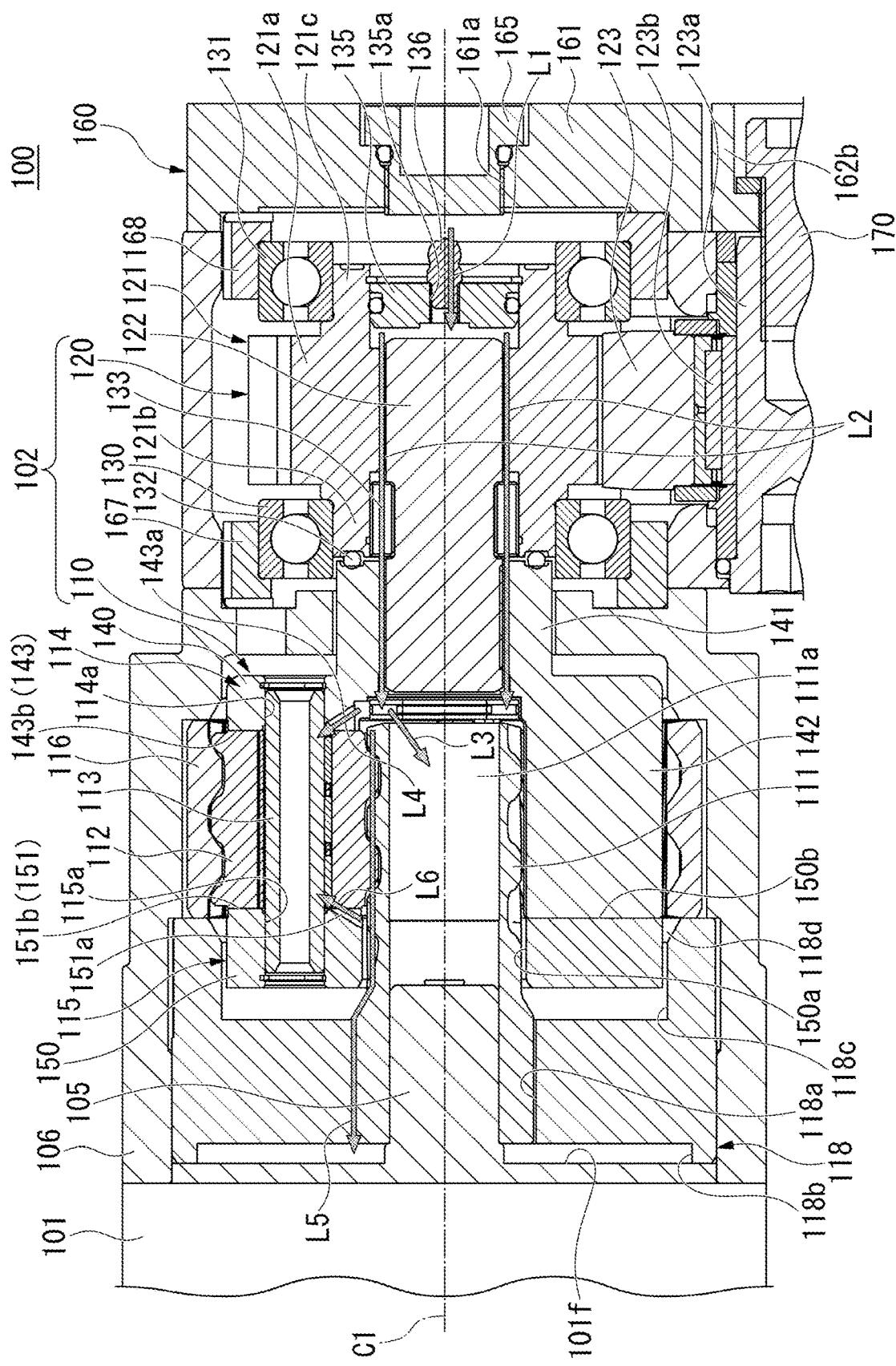
FIG. 13 is an explanatory view of an example of a flow of a lubricant according to the embodiment.

As illustrated in FIG. 13, first, the first lid member 165 is removed from the cover unit 160 to open the first supply opening 161a. Consequently, the grease nipple 136 is exposed through the first supply opening 161a. Next, the grease nipple 136 is opened by connecting a grease gun or the like to the grease nipple 136 and applying a pressure thereto, for example, and a lubricant is supplied to an inner circumferential side (gap) of the transfer gear 121 (arrow L1 direction in the diagram) through the supply hole 135a. Consequently, the lubricant enters the inner circumferential side (gap) of the carriers 114 and 115 (arrow L2 direction in the diagram) along the outer circumference (gap between splines) of the transfer shaft 122. Thereafter, the lubricant enters the hollow portion 111a of the sun gear 111 (arrow L3 direction in the diagram). Accordingly, the lubricant can be stored in the hollow portion 111a.

If the output shaft 105 is rotated in response to driving of the motor 101, the sun gear 111 rotates. Consequently, the lubricant inside the hollow portion 111a of the sun gear 111 flows from the distal end portion of the sun gear 111 in the axial direction toward the outward side in the radial direction due to a centrifugal force. Consequently, a portion of the lubricant which has come out from the distal end portion of the sun gear 111 in the axial direction flows in an arrow LA direction along the first guide groove 143a of the first carrier 114 and enters the inner circumferential side (gap) of the planetary gears 112 and the side surface side (gap) of the planetary gears 112. Thereafter, the lubricant enters the inner circumferential side (gap) of the ring gear 116. Accordingly, the sun gear 111, the planetary gears 112, and the ring gear 116 can be lubricated.

On the other hand, other portions of the lubricant which have come out from the distal end portion of the sun gear 111 in the axial direction flow in an arrow L5 direction along the outer circumference of the sun gear 111 and enters the inner recessed portion 118b of the spacer 118. Accordingly, the lubricant can be stored in the inner recessed portion 118b of the spacer 118.

A portion of the lubricant flowing along the outer circumference of the sun gear 111 flows in an arrow L6 direction along the second guide grooves 151a of the second carrier 115 and enters the inner circumferential side (gap) of the planetary gears 112 and the side surface side (gap) of the planetary gears 112. Thereafter, the lubricant enters the inner circumferential side (gap) of the ring gear 116. Accordingly, the sun gear 111, the planetary gears 112, and the ring gear 116 can be lubricated.

As described above, the lubricant is interposed into the hollow portion 111a of the sun gear 111, the meshed portion of each of the gears, the gap between the motor 101 and the spacer 118, and the like by opening the grease nipple 136 using a grease gun or the like, for example, supplying the lubricant through the supply hole 135a, and driving the motor 101. Accordingly, heat emitted by the motor 101 and heat generated due to friction of each portion can be discharged to the outside through parts, into which the lubricant is interposed, as a route. Therefore, cooling of the motor 101 and the planetary gear mechanism 110 can be promoted.

<Operational Effects>

As described above, the electric cylinder 100 of the present embodiment includes the motor 101 that serves as a driving source, the output shaft 105 that rotates in response to driving of the motor 101, the sun gear 111 that is joined to the output shaft 105 and rotates in response to rotation of the output shaft 105, and the planetary gears 112 that are adjacent to the sun gear 111 and rotate in response to rotation of the sun gear 111. The sun gear 111 has the open hollow portion 111a capable of accommodating a lubricant therein.

According to this constitution, a lubricant can be stored inside the hollow portion 111a of the sun gear 111. Furthermore, if the output shaft 105 is rotated in response to driving of the motor 101, the sun gear 111 rotates. Consequently, the lubricant inside the hollow portion 111a of the sun gear 111 flows from the hollow portion 111a of the sun gear 111 toward the outward side in the radial direction due to a centrifugal force. Consequently, a portion of the lubricant which has come out from the hollow portion 111a of the sun gear 111 is transferred to the planetary gears 112. Accordingly, the lubricant is interposed into the hollow portion 111a of the sun gear 111, the meshed portions of the sun gear 111 and the planetary gears 112, and the like. For this reason, when heat emitted by the motor 101 is transferred from the output shaft 105 to the sun gear 111, heat can be dissipated to the outside via a part into which the lubricant is interposed. Therefore, heat from the motor 101 can be efficiently released to the outside.

In the present embodiment, the output shaft 105 protrudes outward in the axial direction from the end surface 101f of the motor 101 in the axial direction. The first rotor is formed to have a cylindrical shape which is coaxial with the output shaft 105. The hollow portion 111a opens outward in the axial direction of the sun gear 111.

According to this constitution, a portion of a lubricant which has come out from the hollow portion 111a of the sun gear 111 due to centrifugal force flows toward the end surface 101f of the motor 101 in the axial direction along the outer circumference of the sun gear 111. Accordingly, the lubricant is interposed into a part facing the end surface 101f of the motor 101 in the axial direction. For this reason, heat emitted by the motor 101 can be dissipated to the outside via the end surface 101f of the motor 101 in the axial direction and a part into which the lubricant is interposed. Therefore, heat from the motor 101 can be more efficiently released to the outside.

In the present embodiment, the electric cylinder 100 includes the planetary gear mechanism 110 that transmits a driving force of the motor 101 to the piston 182. The planetary gear mechanism 110 includes the sun gear 111, the plurality of planetary gears 112, the carriers 114 and 115 rotatably supporting the central shafts 113 of the plurality of planetary gears 112, and the ring gear 116 surrounding the plurality of planetary gears 112.

According to this constitution, a portion of a lubricant which has come out from the hollow portion 111a of the sun gear 111 due to a centrifugal force enters the inner circumference of each of the planetary gears 112. Thereafter, the lubricant enters the inner circumference of the ring gear 116. Accordingly, the lubricant is interposed into the meshed portion and the like of each of the gears constituting the planetary gear mechanism 110. For this reason, heat emitted by the motor 101 can be dissipated to the outside via a part into which the lubricant is interposed in the planetary gear mechanism 110. Therefore, cooling of the motor 101 and the planetary gear mechanism 110 can be promoted.

In the present embodiment, the carriers 114 and 115 have the guide grooves 143a and 151a extending from positions facing the outer circumference of the sun gear 111 toward the central shafts of the planetary gears 112 and recessed so as to allow the lubricant to circulate therein.

According to this constitution, a portion of a lubricant which has come out from the hollow portion 111a of the sun gear 111 due to centrifugal force flows toward the central shafts 113 of the planetary gears 112 along the guide grooves 143a and 151a of the carriers 114 and 115. Accordingly, the lubricant is interposed into the guide grooves 143a and 151a, parts along the central shafts 113 of the planetary gears 112, and the like. For this reason, heat emitted by the motor 101 can be dissipated to the outside via a part into which the lubricant is interposed through the guide grooves 143a and 151a. Therefore, cooling of the motor 101 and the planetary gear mechanism 110 can be further promoted.

In the present embodiment, the electric cylinder 100 includes the spacer 118 that is disposed between the end surface 101f of the motor 101 in the axial direction and the carriers 114 and 115. The spacer 118 has the penetration hole 118a opening in the axial direction of the motor 101 with a gap with respect to the outer circumference of the sun gear 111.

According to this constitution, a portion of a lubrication portion flowing along the outer circumference of the sun gear 111 enters the penetration hole 118a of the spacer 118 and flows toward the end surface 101f of the motor 101 in the axial direction. Accordingly, the lubricant is interposed into the penetration hole 118a of the spacer 118 and a part facing the end surface 101f of the motor 101 in the axial direction. For this reason, heat emitted by the motor 101 can be dissipated to the outside via a part into which the lubricant is interposed from the end surface 101f of the motor 101 in the axial direction through the penetration hole 118a of the spacer 118. Therefore, heat from the motor 101 can be more efficiently released to the outside.

In the present embodiment, the electric cylinder 100 includes the transfer gear 121 that transmits rotational forces of the carriers 114 and 115 to the piston 182, and the transfer shaft 122 that extends outward in the axial direction from a position facing the outer end of the sun gear 111 in the axial direction. The carrier 114 is coupled to the first end portion side of the transfer shaft 122 in the axial direction using a spline. The transfer gear 121 is coupled to the second end portion side of the transfer shaft 122 in the axial direction using a spline.

According to this constitution, a lubricant is interposed into a part facing an outer edge of the sun gear 111 in the axial direction, a part along the transfer shaft 122 (gap between splines), and the like. For this reason, heat emitted by the motor 101 can be dissipated to the outside via a part into which the lubricant is interposed along the transfer shaft 122. Therefore, cooling of the motor 101 and the planetary gear mechanism 110 can be further promoted.

In the present embodiment, the electric cylinder 100 includes the cover member 135 that has the open supply hole 135a capable of supplying a lubricant to the second end portion side of the transfer shaft 122 in the axial direction from the outside, and the grease nipple 136 that is provided in the cover member 135 and is capable of being opened and closed so as to allow the lubricant to be supplied to the supply hole 135a from the outside.

According to this constitution, after the electric cylinder 100 is assembled, the grease nipple 136 can be opened, and a lubricant can be supplied to the meshed portion of each of the gears and the hollow portion 111a of the sun gear 111 from the outside through the supply hole 135a.

For example, a lubricant can be supplied by the following procedure. First, the grease nipple 136 is exposed to the outside. Next, the grease nipple 136 is opened by connecting a grease gun or the like to the grease nipple 136 and applying a pressure thereto, for example, and a lubricant is supplied to the inner circumferential side (gap) of the transfer gear 121 through the supply hole 135a. Consequently, the lubricant enters the inner circumferential side (gap) of the carriers 114 and 115 along the outer circumference (gap between splines) of the transfer shaft 122. Thereafter, the lubricant enters the hollow portion 111a of the sun gear 111. Accordingly, the lubricant can be supplied to the meshed portion of each of the gears and the hollow portion 111a of the sun gear 111 from the outside through the supply hole 135a.

In the present embodiment, the excavator 1 includes the vehicle main body 2 and the work apparatus 3 joined to the vehicle main body 2. The work apparatus 3 includes the foregoing electric cylinder 100.

For this reason, it is possible to provide the excavator 1 in which heat from the motor 101 can be efficiently released to the outside.

In the present embodiment, the work apparatus 3 includes common electric cylinders 100 as the first electric cylinder 100A, the second electric cylinder 100B, and the third electric cylinder 100C.

For this reason, compared to a case of including electric cylinders different from each other as the first electric cylinder 100A, the second electric cylinder 100B, and the third electric cylinder 100C, the number of components can be reduced and cost reduction can be achieved.

Other Embodiments

In the embodiment described above, an example in which the hollow portion opens outward in the axial direction of the sun gear has been described, but it is not limited thereto. For example, the hollow portion may open outward in the radial direction of the sun gear. For example, the opening form of the hollow portion can be changed in accordance with required specifications.

In the embodiment described above, an example in which the electric cylinder includes a planetary gear mechanism transmitting a driving force of the motor to the piston has been described, but it is not limited thereto. For example, the electric cylinder may not include the planetary gear mechanism. For example, the electric cylinder may include a power transmission system other than a planetary gear mechanism, such as a belt pulley mechanism or a rack-and-pinion mechanism. For example, the form of the power transmission system can be changed in accordance with required specifications.

In the embodiment described above, an example in which the electric cylinder includes the sun gear that rotates in response to rotation of the output shaft and the planetary gears that are adjacent to the sun gear and rotate in response to rotation of the sun gear, and the sun gear has the open hollow portion capable of accommodating a lubricant therein has been described, but it is not limited thereto. For example, the electric cylinder may include a pulley that rotates in response to rotation of the output shaft and a belt that rotates in response to rotation of the pulley, and the pulley may have an open hollow portion capable of accommodating a lubricant therein. For example, the electric cylinder may include a pinion that rotates in response to rotation of the output shaft, a belt that moves in response to rotation of the pinion, and a gear that rotates due to movement of the belt, and the pinion may have an open hollow portion capable of accommodating a lubricant therein. For example, the form of the rotor having a hollow portion can be changed in accordance with required specifications. For example, the electric cylinder need only include a motor that serves as a driving source, an output shaft that rotates in response to driving of the motor, a first rotor that is joined to the output shaft and rotates in response to rotation of the output shaft, and the second rotor that is adjacent to the first rotor and rotates in response to rotation of the first rotor, and the first rotor need only have an open hollow portion capable of accommodating a lubricant therein.

In the embodiment described above, an example in which the carriers have the guide grooves extending from positions facing the outer circumference of the sun gear toward the central shafts of the planetary gears and recessed so as to allow a lubricant to circulate therein has been described, but it is not limited thereto. For example, the guide grooves may extend in the axial direction along the outer circumferences of the carriers. For example, the carriers may not have guide grooves. For example, the form of the carriers can be changed in accordance with required specifications.

In the embodiment described above, an example in which the electric cylinder includes the spacer that is disposed between the end surface of the motor in the axial direction and the carriers, and the spacer has the penetration hole opening in the axial direction of the motor with a gap with respect to the outer circumference of the sun gear has been described, but it is not limited thereto. For example, the spacer may not be disposed between the end surface of the motor in the axial direction and the carriers. For example, the carriers may face the end surface of the motor in the axial direction, and the carriers may have a penetration hole opening in the axial direction of the motor with a gap with respect to the outer circumference of the sun gear. For example, the installation form of the spacer can be changed in accordance with required specifications.

In the embodiment described above, an example in which the electric cylinder includes the transfer gear that transmits rotational forces of the carriers to the piston, and the transfer shaft that extends outward in the axial direction from a position facing the outer end of the sun gear in the axial direction, and the carriers are coupled to a first end portion side of the transfer shaft in the axial direction using a spline and the transfer gear is coupled to a second end portion side of the transfer shaft in the axial direction using a spline has been described, but it is not limited thereto. For example, the carriers may be coupled by a form other than using a spline, such as press-fitting with respect to a first end portion side of the transfer shaft in the axial direction. For example, the transfer gear may be coupled by a form other than using a spline, such as press-fitting with respect to a second end portion side of the transfer shaft in the axial direction. For example, the coupling form of the transfer shaft can be changed in accordance with required specifications.

In the embodiment described above, an example in which the electric cylinder includes the cover member that has the open supply hole capable of supplying a lubricant to the second end portion side of the transfer shaft in the axial direction from the outside, and the grease nipple that is provided in the cover member and is capable of being opened and closed so as to allow the lubricant to be supplied to the supply hole from the outside has been described, but it is not limited thereto. For example, the electric cylinder may not include the cover member and the grease nipple. For example, the second end portion side of the transfer shaft in the axial direction may be covered by the transfer gear. For example, the supply hole may be provided in a member other than the cover member, such as the transfer gear. For example, the grease nipple may be provided in a member other than the cover member, such as the transfer gear. For example, the installation form of the supply hole and the installation form of the grease nipple can be changed in accordance with required specifications.

In the embodiment described above, an example in which the work apparatus includes common electric cylinders as the first electric cylinder, the second electric cylinder, and the third electric cylinder has been described, but it is not limited thereto. For example, the work apparatus may include electric cylinders different from each other as the first electric cylinder, the second electric cylinder, and the third electric cylinder. For example, the installation form of the electric cylinder can be changed in accordance with required specifications.

In the embodiment described above, an excavator has been described as an example of a work machine (work vehicle), but it is not limited thereto. For example, the present invention may be applied to other work vehicles such as dump trucks, bulldozers, and wheel loaders.

Hereinabove, an embodiment of the present invention has been described, but the present invention is not limited to these. Addition, omission, replacement, and other changes of the constitution can be made within a range not departing from the gist of the present invention, and the embodiment described above can also be suitably combined.

BRIEF DESCRIPTION OF THE REFERENCE SYMBOLS

1 Excavator (work machine)
2 Vehicle main body
3 Work apparatus
100 Electric cylinder
100A First electric cylinder (electric cylinder)
100B Second electric cylinder (electric cylinder)
100C Third electric cylinder (electric cylinder)
101 Motor
101f End surface of motor in axial direction
101A First motor (motor)
101B Second motor (motor)
101C Third motor (motor)
105 Output shaft
110 Planetary gear mechanism
111 Sun gear (first rotor)
111a Hollow portion
112 Planetary gear (second rotor)
113 Planetary shaft (central axis of planetary gear)
114 First carriers (carrier)
115 Second carriers (carrier)
116 Ring gear
118 Spacer
118a Penetration hole
121 Transfer gear
122 Transfer shaft
135 Cover member
135a Supply hole
136 Grease nipple
143a First guide grooves (guide groove)

151a Second guide grooves (guide groove)
182 Piston

The invention claimed is:
1. An electric cylinder comprising:
a motor that serves as a driving source;
an output shaft that rotates in response to driving of the motor;
a first rotor that is joined to the output shaft and rotates in response to rotation of the output shaft; and
a second rotor that is adjacent to the first rotor and rotates in response to rotation of the first rotor,
wherein the first rotor has an open hollow portion accommodating a lubricant therein,
wherein the lubricant inside the hollow portion is configured to flow toward the outward side in the radial direction of the first rotor in response to rotation of the first rotor.

2. The electric cylinder according to claim 1,
wherein the output shaft protrudes outward in an axial direction from an end surface of the motor in the axial direction,
the first rotor is formed to have a cylindrical shape which is coaxial with the output shaft, and
the hollow portion opens outward in the axial direction of the first rotor.

3. The electric cylinder according to claim 2 further comprising:
a planetary gear mechanism that transmits a driving force of the motor to a piston,
wherein the planetary gear mechanism includes
a sun gear serving as the first rotor,
a plurality of planetary gears serving as the second rotor,
carriers rotatably supporting central shafts of the plurality of planetary gears, and a ring gear surrounding the plurality of planetary gears.

4. The electric cylinder according to claim 3,
wherein the carriers have guide grooves extending from positions facing an outer circumference of the sun gear toward the central shafts of the planetary gears and recessed so as to allow the lubricant to circulate therein.

5. The electric cylinder according to claim 3 further comprising:
a spacer that is disposed between the end surface of the motor in the axial direction and the carriers,
wherein the spacer has a penetration hole opening in the axial direction of the motor with a gap with respect to the outer circumference of the sun gear.

6. The electric cylinder according to claim 3 further comprising:
a transfer gear that transmits rotational forces of the carriers to the piston; and
a transfer shaft that extends outward in the axial direction from a position facing an outer end of the sun gear in the axial direction,
wherein the carriers are coupled to a first end portion side of the transfer shaft in the axial direction using a spline, and
the transfer gear is coupled to a second end portion side of the transfer shaft in the axial direction using a spline.

7. The electric cylinder according to claim 6 further comprising:
a cover member that has an open supply hole capable of supplying the lubricant to the second end portion side of the transfer shaft in the axial direction from the outside; and
a grease nipple that is provided in the cover member and is capable of being opened and closed so as to allow the lubricant to be supplied to the supply hole from the outside.

8. A work machine comprising:
a vehicle main body; and
a work apparatus that is joined to the vehicle main body,
wherein the work apparatus includes the electric cylinder according to claim 1.

9. An electric cylinder comprising:
a motor that serves as a driving source;
an output shaft that rotates in response to driving of the motor;
a first rotor that is joined to the output shaft and rotates in response to rotation of the output shaft; and
a second rotor that is adjacent to the first rotor and rotates in response to rotation of the first rotor,
wherein the first rotor has an open hollow portion capable of accommodating a lubricant therein,
wherein the output shaft protrudes outward in an axial direction from an end surface of the motor in the axial direction,
the first rotor is formed to have a cylindrical shape which is coaxial with the output shaft, and
the hollow portion opens outward in the axial direction of the first rotor, wherein the electric cylinder further comprising:
a planetary gear mechanism that transmits a driving force of the motor to a piston,
wherein the planetary gear mechanism includes
a sun gear serving as the first rotor,
a plurality of planetary gears serving as the second rotor,
carriers rotatably supporting central shafts of the plurality of planetary gears, and
a ring gear surrounding the plurality of planetary gears,
wherein the carriers have guide grooves extending from positions facing an outer circumference of the sun gear toward the central shafts of the planetary gears and recessed so as to allow the lubricant to circulate therein.

* * * * *